(12) United States Patent
Amano et al.

(10) Patent No.: US 11,904,834 B2
(45) Date of Patent: Feb. 20, 2024

(54) CONTROL DEVICE AND CONTROL METHOD FOR SERIES HYBRID VEHICLE

(71) Applicant: TOYOTA JIDOSHA KABUSHIKI KAISHA, Toyota (JP)

(72) Inventors: Takashi Amano, Susono (JP); Tomohito Ono, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 17/203,009

(22) Filed: Mar. 16, 2021

(65) Prior Publication Data
US 2021/0300329 A1 Sep. 30, 2021

(30) Foreign Application Priority Data
Mar. 24, 2020 (JP) .............................. JP2020-053234

(51) Int. Cl.
*B60W 20/15* (2016.01)
*B60W 10/06* (2006.01)
(Continued)

(52) U.S. Cl.
CPC ............ *B60W 20/15* (2016.01); *B60W 10/06* (2013.01); *B60W 10/08* (2013.01); *B60W 10/24* (2013.01);
(Continued)

(58) Field of Classification Search
CPC ...... B60W 20/15; B60W 20/20; B60W 10/06; B60W 10/08; B60W 10/24; B60W 2510/248; B60W 2510/0638; B60W 2510/0657; B60W 2510/068; B60W 2520/10; F01N 3/2006; F02D 41/0235; F02D 2041/0265
See application file for complete search history.

(56) References Cited

U.S. PATENT DOCUMENTS 6,470,985 B1 * 10/2002 Inada ...................... B60K 6/46
903/917
9,527,498 B2    12/2016 Martin et al.
(Continued)

FOREIGN PATENT DOCUMENTS

DE  10 2015 204 093 A1   9/2016
JP     H11-082093 A      3/1999
(Continued)

*Primary Examiner* — George C Jin
(74) *Attorney, Agent, or Firm* — Oliff PLC

(57) ABSTRACT

A control device for a series hybrid vehicle, the series hybrid vehicle including: an engine, a catalyst that is disposed in an exhaust path of the engine, a generator that generates electric power using power output from the engine, a battery that stores the electric power generated by the generator, and a traction electric motor that is driven with electric power of the battery, the control device including an electronic control unit configured to: acquire information on a temperature of the catalyst; and, when the information on the temperature of the catalyst is information corresponding to the temperature of the catalyst being equal to or higher than a predetermined temperature, change an operating point of the engine to an operating point that reduces a temperature of the exhaust gas while generating the electric power by the generator.

8 Claims, 12 Drawing Sheets

(51) Int. Cl.
*B60W 10/08* (2006.01)
*B60W 10/24* (2006.01)
*F01N 3/20* (2006.01)
*F02D 41/02* (2006.01)

(52) U.S. Cl.
CPC ....... *F01N 3/2006* (2013.01); *F02D 41/0235* (2013.01); *B60W 2510/0638* (2013.01); *B60W 2510/0657* (2013.01); *B60W 2520/10* (2013.01); *F02D 2041/0265* (2013.01)

(56) References Cited

U.S. PATENT DOCUMENTS

| | | | |
|---|---|---|---|
| 10,232,852 B2* | 3/2019 | Morimoto | B60W 10/06 |
| 2005/0262827 A1 | 12/2005 | Ichimoto et al. | |
| 2008/0078166 A1* | 4/2008 | Rose | B60W 10/08 |
| | | | 60/284 |
| 2015/0151759 A1* | 6/2015 | Oyama | B60K 6/445 |
| | | | 180/65.265 |
| 2018/0086333 A1* | 3/2018 | Oguma | B60W 20/20 |
| 2020/0386135 A1* | 12/2020 | Kobayashi | F02D 45/00 |
| 2021/0300329 A1* | 9/2021 | Amano | F02D 41/0235 |

FOREIGN PATENT DOCUMENTS

| | | | |
|---|---|---|---|
| JP | 2005-282431 A | 10/2005 | |
| JP | 2005-337171 A | 12/2005 | |
| JP | 2013-213472 A | 10/2013 | |
| JP | 2014-004924 A | 1/2014 | |
| JP | 2018-052343 A | 4/2018 | |
| JP | 2019-151283 A | 9/2019 | |
| KR | 101798025 B1 | 11/2017 | |

* cited by examiner

CONTROL DEVICE AND CONTROL METHOD FOR SERIES HYBRID VEHICLE

CROSS-REFERENCE TO RELATED APPLICATION

This application claims priority to Japanese Patent Application No. 2020-053234 filed on Mar. 24, 2020, incorporated herein by reference in its entirety.

BACKGROUND

1. Technical Field

The disclosure relates to control devices and control methods for series hybrid vehicles.

2. Description of Related Art

What are called series hybrid vehicles are conventionally known in the art. The series hybrid vehicles do not use an engine as a traction driving force source, and travel with a drive motor driven with electric power supplied from either or both of a generator and a battery. In the series hybrid vehicles, the engine is driven to generate electric power by the generator regardless of the traveling state of the vehicle. Exhaust gas from the engine therefore continuously passes through a catalyst, and the catalyst temperature increases due to the heat of the exhaust gas. When the catalyst becomes too hot due to the heat of the exhaust gas, the catalyst may be rapidly deactivated.

Japanese Unexamined Patent Application Publication No. 2005-337171 (JP 2005-337171 A) discloses a technique for cooling a catalyst in a series hybrid vehicle. In this technique, when desired torque of an engine is zero but the engine is idling without fuel cut, it is determined whether a condition for stopping the engine is satisfied. When the condition for stopping the engine is satisfied, it is determined whether the load on the catalyst that controls exhaust gas from the engine is high. When the load on the catalyst is high, the engine continues to idle to cool the catalyst.

SUMMARY

The series hybrid vehicles are often configured with a combination of a small engine and a large capacity battery. In the case of such a small engine, the engine is often driven under high load conditions in order to generate electric power by the generator. The engine therefore more frequently emits high temperature exhaust gas, and the catalyst becomes hot more frequently. Accordingly, in the series hybrid vehicles, it is sometimes desired to reduce the catalyst temperature in order to reduce deactivation of the catalyst while maintaining power generation by the generator during traveling of the vehicle.

The disclosure was made in view of the above problem, and it is an object of the disclosure to provide a control device for a series hybrid vehicle that can cause a generator to generate electric power while reducing an increase in catalyst temperature due to exhaust gas.

A first aspect of the disclosure relates to a control device for a series hybrid vehicle, the series hybrid vehicle including: an engine, a catalyst that is disposed in an exhaust path of the engine and controls exhaust gas, a generator that generates electric power using power output from the engine, a battery that stores the electric power generated by the generator, and a traction electric motor that is driven with electric power of the battery, the control device including an electronic control unit configured to: acquire information on a temperature of the catalyst; and when the information on the temperature of the catalyst is information corresponding to the temperature of the catalyst being equal to or higher than a predetermined temperature, change an operating point of the engine to an operating point that reduces a temperature of the exhaust gas while generating the electric power by the generator.

The control device for the series hybrid vehicle according to the disclosure changes the operating point of the engine to the operating point that reduces the temperature of the exhaust gas while generating the electric power by the generator, when the information on the temperature of the catalyst is information corresponding to the temperature of the catalyst being equal to or higher than the predetermined temperature. Accordingly, the control device can cause the generator to generate electric power while reducing an increase in catalyst temperature due to the exhaust gas.

In the above aspect, the electronic control unit may be configured to move the operating point to a power generation operation line that reduces an amount of power generation of the generator at the same vehicle speed. The power generation operation line may be included in a plurality of power generation operation lines defined on a two-dimensional map that is determined by a vehicle speed and the amount of power generation of the generator.

Since the amount of power generation is reduced, a driving force from the engine that is used to drive the generator to generate electric power can be reduced accordingly. Accordingly, the temperature of the exhaust gas from the engine can be reduced, and the temperature of the catalyst can be quickly reduced.

In the above aspect, the information on the temperature of the catalyst may be the amount of power generation of the generator.

This makes it easy to determine the catalyst temperature.

In the above aspect, the electronic control unit may be configured to return the operating point to an original power generation operation line when the information on the temperature of the catalyst indicates that the temperature of the catalyst has become lower than a catalyst deactivation temperature.

A required amount of power generation can thus be provided while reducing deactivation of the catalyst.

In the above aspect, the electronic control unit may be configured to set the plurality of power generation operation lines as a power generation operation area and select the power generation operation area.

This can make it easier to change the operating point of the engine to an operating point that reduces the catalyst temperature (exhaust gas temperature) while maintaining an engine power generation amount.

In the above aspect, the electronic control unit may be configured to move the operating point to an engine operation line that maintains an amount of power generation of the generator and reduces an engine speed. The engine operation line may be included in a plurality of engine operation lines defined on a two-dimensional map that is determined by engine torque and the engine speed.

Noise and vibration (NV) performance can thus be improved while maintaining the amount of power generation.

In the above aspect, the electronic control unit may be configured to change the operating point when a decrease in accelerator opening amount is larger than a predetermined value.

Engine control in view of the NV performance can thus be performed according to the user's intention of deceleration.

In the above aspect, the electronic control unit may be configured to perform low load operation of the engine when the electronic control unit determines at a predetermined timing that the temperature of the catalyst is not going to become lower than a catalyst deactivation temperature, based on the information on the temperature of the catalyst.

As the low load operation of the engine is thus performed, exhaust gas with a reduced temperature contacts the catalyst. The temperature drop rate is thus increased, whereby the catalyst temperature can be reduced to a temperature lower than the catalyst deactivation temperature.

A second of the disclosure relates to a control method for a series hybrid vehicle, the series hybrid vehicle including: an engine, a catalyst that is disposed in an exhaust path of the engine and controls exhaust gas, a generator that generates electric power using power output from the engine, a battery that stores the electric power generated by the generator, and a traction electric motor that is driven with electric power of the battery, the control method including: acquiring information on a temperature of the catalyst, and when the information on the temperature of the catalyst is information corresponding to the temperature of the catalyst being equal to or higher than a predetermined temperature, changing an operating point of the engine to an operating point that reduces a temperature of the exhaust gas while generating the electric power by the generator.

The control device and the control method for the series hybrid vehicle according to the disclosure changes the engine operating point to an operating point that reduces the exhaust gas temperature. The control device for the series hybrid vehicle according to the disclosure can thus cause the generator to generate electric power while reducing an increase in catalyst temperature due to exhaust gas.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

A first embodiment of a power generation control device according to the disclosure will be described. The disclosure is not limited by the embodiment.

Figure 1:
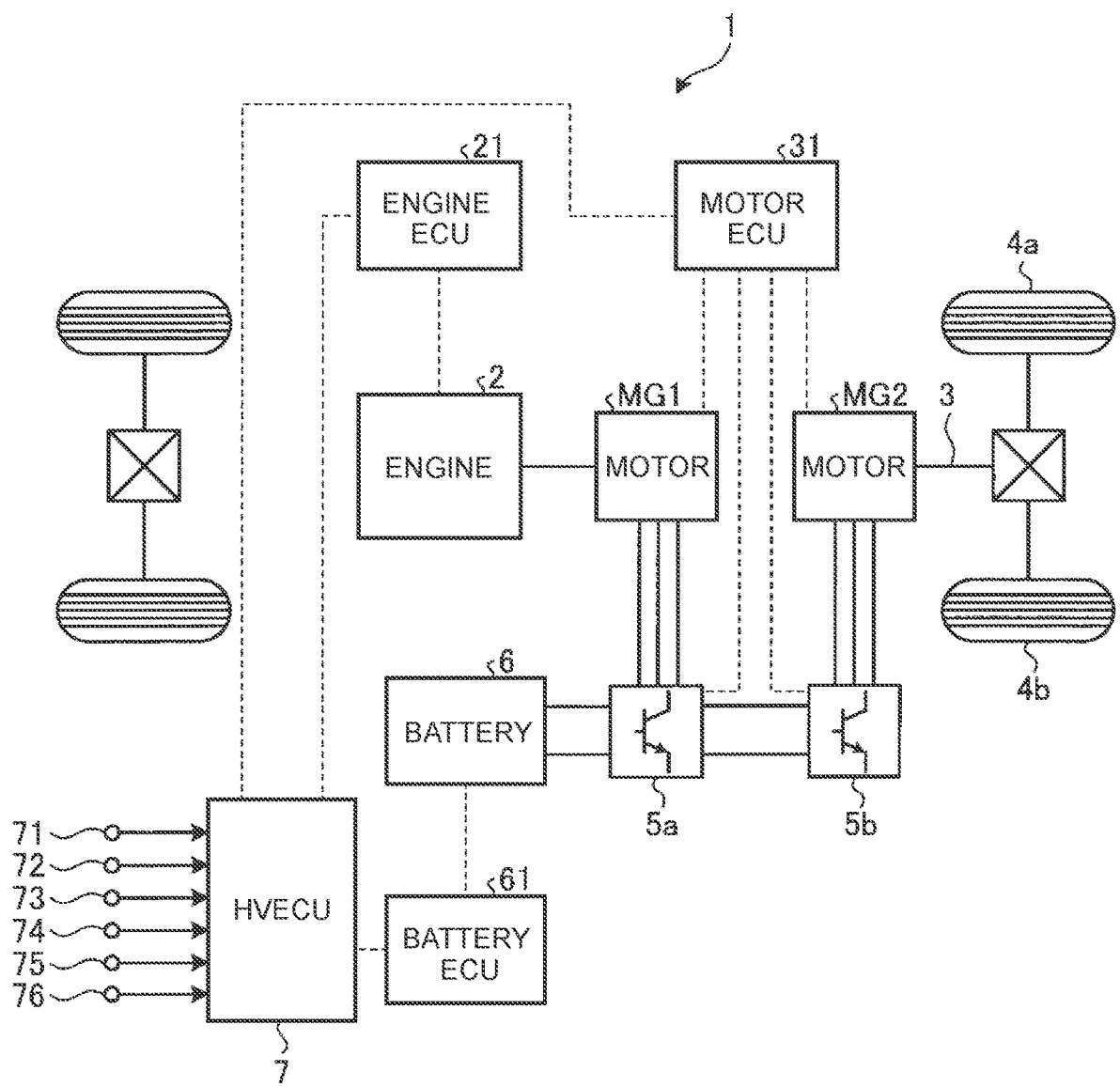
FIG. 1 is a skeleton diagram schematically illustrating a series hybrid vehicle according to an embodiment.

FIG. 1 is a skeleton diagram schematically illustrating a series hybrid vehicle 1 according to the first embodiment. In the series hybrid vehicle 1, a power generation motor MG1 is connected to an output shaft of an engine 2, and drive wheels 4a, 4b are coupled to a drive motor MG2 via a drive shaft 3. The power generation motor MG1 is a motor for power generation, and the drive motor MG2 is a traction motor. The series hybrid vehicle 1 includes the engine 2, the power generation motor MG1, the drive motor MG2, inverters 5a, 5b, a battery 6, and a hybrid vehicle electronic control unit (HVECU) 7. The HVECU 7 is an electronic control device for hybrid driving.

The engine 2 is a well-known internal combustion engine. A catalyst for controlling exhaust gas is disposed in an exhaust path of the engine 2. That is, the series hybrid vehicle 1 includes a catalytic converter that controls exhaust gas using a three-way catalyst. Controlling exhaust gas includes, for example but not limited to, reducing toxic gases and pollutants in exhaust gas. The engine 2 is controlled by an engine ECU 21. The engine ECU 21 is an electronic control device for an engine.

The engine ECU 21 is a microprocessor and includes a central processing unit (CPU), a read only memory (ROM), a random access memory (RAM), etc. The engine ECU 21 is connected to the HVECU 7 so that it can communicate with the HVECU 7. The engine ECU 21 controls the engine 2 based on command signals received from the HVECU 7. For example, the engine ECU 21 controls fuel injection to the engine 2 and ignition timing.

Both of the power generation motor MG1 and the drive motor MG2 are motor-generators. The power generation motor MG1 is a generator that is driven by the engine 2. A rotor of the power generation motor MG1 is connected to the output shaft of the engine 2, and the power generation motor MG1 generates electric power using the power output from the engine 2. The drive motor MG2 is a traction electric motor that is driven using the electric power of the battery 6. A rotor of the drive motor MG2 is connected to the drive shaft 3, and the drive motor MG2 is driven using the power of the battery 6. The inverters 5a, 5b are electrically connected to the power generation motor MG1 and the drive motor MG2 and are also electrically connected to the battery 6. The power generation motor MG1 is electrically connected to the drive motor MG2 via the inverters 5a, 5b. The power generation motor MG1 and the drive motor MG2 are controlled by a motor ECU 31. The motor ECU 31 is an electronic control device for a motor.

The motor ECU 31 is a microprocessor that is similar to that of the engine ECU 21. The motor ECU 31 is connected to the HVECU 7 so that it can communicate with the HVECU 7. For example, the motor ECU 31 controls the power generation motor MG1 and the drive motor MG2 by controlling switching of a plurality of switching elements of the inverters 5a, 5b based on command signals received from the HVECU 7. More specifically, the motor ECU 31 causes the power generation motor MG1 to function as a generator and at the same time causes the drive motor MG2 to function as an electric motor (power running control). The motor ECU 31 also causes the power generation motor MG1 to function as a generator and at the same time causes the drive motor MG2 to function as a generator (regenerative control). The motor ECU 31 also causes the power generation motor MG1 to generate either a minimum amount of electric power or no electric power and causes the drive motor MG2 to function as a generator.

The battery 6 is a secondary battery such as a lithium-ion battery or a nickel metal hydride battery. The battery 6 is electrically connected to the inverters 5a, 5b. The battery 6 is controlled by a battery ECU 61. The battery ECU 61 is an electronic control device for a battery.

The battery ECU 61 is a microprocessor and is connected to the HVECU 7 so that it can communicate with the HVECU 7. The battery ECU 61 manages the state of charge (SOC) of the battery 6.

The HVECU 7 is a microprocessor and controls the series hybrid vehicle 1. Signals from various sensors are input to the HVECU 7. Examples of the signals that are input to the HVECU 7 include: an engine speed signal from an engine speed sensor 71 that detects the rotational speed of the engine 2; an accelerator operation amount signal from an accelerator pedal position sensor 72 that detects the amount of depression of an accelerator pedal; a brake pedal position signal from a brake stroke sensor 73 that detects the amount of depression of a brake pedal; a vehicle speed signal from a vehicle speed sensor 74; an SOC signal from an SOC sensor 75 that detects the SOC of the battery 6; and a catalyst temperature signal from a catalyst temperature sensor 76 that detects the temperature of the catalyst. The HVECU 7 can perform various arithmetic operations and output command signals to the engine ECU 21, the motor ECU 31, and the battery ECU 61 based on the results of the arithmetic operations. A control device for the series hybrid vehicle 1 of the first embodiment includes at least the HVECU 7 out of the HVECU 7, the engine ECU 21, the motor ECU 31, and the battery ECU 61.

The HVECU 7 performs SOC control. Namely, the HVECU 7 manages the SOC of the battery 6 within the battery charging capacity. For example, the HVECU 7 and the battery ECU 61 can detect an actual SOC of the battery 6 based on the SOC signal sent from the SOC sensor 75 to the HVECU 7. The HVECU 7 manages the power balance between the amount of power generation of the power generation motor MG1 and the amount of power consumption of the drive motor MG2 according to the traveling state of the series hybrid vehicle 1 and controls the SOC within the battery charging capacity so that the battery 6 is neither overcharged nor overdischarged. In the following description, power generation of the power generation motor MG1 using the engine 2 is sometimes referred to as engine power generation, and the amount of power generation of the power generation motor MG1 is sometimes referred to as the engine power generation amount.

When driving the engine 2, the HVECU 7 controls an operating point of the engine 2 (engine operating point). The engine operating point is an operating point that is determined by the torque of the engine 2 (engine torque) and the rotational speed of the engine 2 (engine speed). For example, when the power generation motor MG1 generates electric power using the power output from the engine 2 while the series hybrid vehicle 1 is traveling, the HVECU 7 controls the engine 2 so that the engine operating point is located on an optimum fuel economy line. When the engine 2 is driven in this manner, the catalyst disposed in the exhaust path of the engine 2 controls exhaust gas.

In the case where catalyst temperature information, which is information on the temperature of the catalyst, is information corresponding to the temperature of the catalyst being equal to or higher than a predetermined temperature, the HVECU 7 performs, during deceleration etc., control of changing the operating point of the engine 2 to an operating point that reduces the temperature of exhaust gas while causing the power generation motor MG1 to generate electric power. The HVECU 7 thus causes the power generation motor MG1 to generate electric power while reducing an increase in temperature of the catalyst due to exhaust gas. The catalyst temperature information is not limited to the temperature of the catalyst detected by the catalyst temperature sensor 76, and may be a controlled value for estimating the catalyst temperature, such as the engine power generation amount. This is because as the engine power generation amount increases, the exhaust gas temperature increases and therefore the catalyst temperature also increases, and as the engine power generation amount decreases, the exhaust gas temperature decreases and therefore the catalyst temperature also decreases. The controlled value for estimating the catalyst temperature may be accumulated engine output Ga in a catalyst deactivation temperature range, elapsed time, etc.

In the embodiment, the HVECU 7 functions as information acquiring means for acquiring the catalyst temperature information and also functions as changing means for changing the operating point of the engine 2. The HVECU 7 has one or more power generation operation lines defined on a two-dimensional map that is determined by the vehicle speed and the engine power generation amount, and one or more engine operation lines defined on a two-dimensional map that is determined by the engine torque and the engine speed. The two-dimensional maps defining the power generation operation lines and the engine operation lines, for example, may be stored in a memory device included in the HVECU 7 or may be acquired by the HVECU 7 from a server or any other devices out of the vehicle through communication. The HVECU 7 further has a map of pre-calculated time it takes from the current vehicle speed until the vehicle is stopped. This map is obtained according to the road load (aerodynamic drag, rolling resistance, the number of occupants, load placed on the vehicle, etc.) on the series hybrid vehicle 1.

Figure 2:
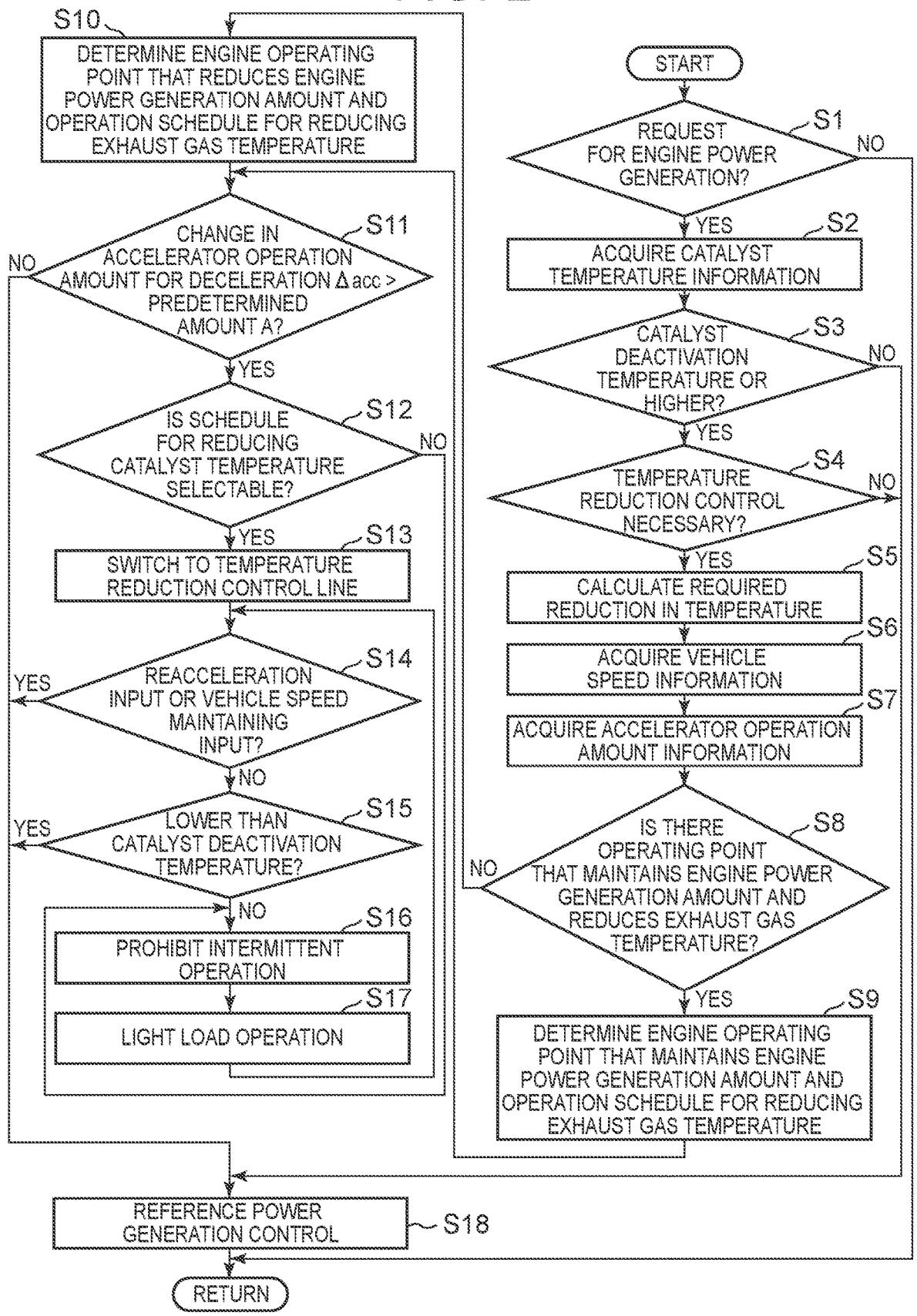
FIG. 2 is a flowchart illustrating an example of power generation control in a first embodiment.

FIG. 2 is a flowchart illustrating an example of power generation control in the first embodiment. First, the HVECU 7 determines whether there is a request for engine power generation (step S1). When the HVECU 7 determines that there is no request for engine power generation (No in step S1), the HVECU 7 returns the control routine. When the HVECU 7 determines that there is a request for engine power generation (Yes in step S1), the HVECU 7 acquires catalyst temperature information (step S2). The HVECU 7 subsequently acquires the catalyst temperature information as necessary.

Next, the HVECU 7 determines whether the catalyst temperature is equal to or higher than a catalyst deactivation temperature (step S3). For example, the catalyst deactivation temperature is 750° C. When the HVECU 7 determines that the catalyst temperature is not equal to or higher than the catalyst deactivation temperature (No in step S3), the HVECU 7 performs reference power generation control (step S18). The HVECU 7 then returns the control routine. When the HVECU 7 determines that the catalyst temperature is equal to or higher than the catalyst deactivation temperature (Yes in step S3), the HVECU 7 determines whether temperature reduction control is necessary (step S4). In the embodiment, for example, the HVECU 7 determines that the temperature reduction control is necessary when the catalyst temperature is 780° C. or higher. When the HVECU 7 determines that the temperature reduction control is not necessary (No in step S4), the HVECU 7 performs the reference power generation control (step S18). The HVECU 7 then returns the control routine. When the HVECU 7 determines that the temperature reduction control is necessary (Yes in step S4), the HVECU 7 calculates a required reduction in catalyst temperature (step S5). The HVECU 7 then acquires vehicle speed information (step S6). Thereafter, the HVECU 7 acquires accelerator operation amount information (step S7).

Subsequently, the HVECU 7 determines whether there is an engine operating point that maintains the engine power generation amount and reduces the exhaust gas temperature (step S8). Of the engine operating points that reduce the exhaust gas temperature, some engine operating points can maintain the engine power generation amount, while other engine operating points cannot maintain the engine power generation amount. The control routine therefore has this determination step. When the HVECU 7 determines that there is an engine operating point that maintains the engine power generation amount and reduces the exhaust gas temperature (Yes in step S8), the HVECU 7 determines the engine operating point that maintains the engine power generation amount and an operation schedule for reducing the exhaust gas temperature (step S9). The HVECU 7 then proceeds to step S11. When the HVECU 7 determines that there is no engine operating point that maintains the engine power generation amount and reduces the exhaust gas temperature (No in step S8), the HVECU 7 determines an engine operating point that reduces the engine power generation amount and an operation schedule for reducing the exhaust gas temperature (step S10). The HVECU 7 then proceeds to step S11.

Thereafter, the HVECU 7 determines whether "a change in accelerator operation amount for deceleration $\Delta acc$>a predetermined amount A" is satisfied (step S11). When the HVECU 7 determines that "the change in accelerator operation amount for deceleration $\Delta acc$>the predetermined amount A" is not satisfied (No in step S11), the HVECU 7 performs the reference power generation control (step S18). The HVECU 7 then returns the control routine. When the HVECU 7 determines that "the change in accelerator operation amount for deceleration $\Delta acc$>the predetermined amount A" is satisfied (Yes in step S11), the HVECU 7 determines whether a schedule for reducing the catalyst temperature is selectable (step S12). When the HVECU 7 determines that the schedule for reducing the catalyst temperature is selectable (Yes in step S12), the HVECU 7 switches to a temperature reduction control line (step S13). The temperature reduction control line refers to various engine operation lines and power generation operation lines along which the engine operating point is moved during the temperature reduction control.

Subsequently, the HVECU 7 determines whether there is a reacceleration input or a vehicle speed maintaining input (step S14). When the HVECU 7 determines that there is neither a reacceleration input nor a vehicle speed maintaining input (No in step S14), the HVECU 7 determines at a predetermined timing whether the catalyst temperature is lower than the catalyst deactivation temperature (step S15). When the HVECU 7 determines that the catalyst temperature is not lower than the catalyst deactivation temperature (No in step S15), the HVECU 7 proceeds to step S16. When the HVECU 7 determines in step S12 that the schedule for reducing the catalyst temperature is not selectable (No in step S12), the HVECU 7 proceeds to step S16. The HVECU 7 then prohibits intermittent operation of the engine 2 (step S16) and thereafter performs low load operation of the engine 2 (step S17). The HVECU 7 then proceeds to step S14.

When the HVECU 7 determines in step S14 that there is a reacceleration input or a vehicle speed maintaining input (Yes in step S14), the HVECU 7 performs the reference power generation control (step S18). The HVECU 7 then returns the control routine. When the HVECU 7 determines in step S15 that the catalyst temperature is lower than the catalyst deactivation temperature (Yes in step S15), the HVECU 7 performs the reference power generation control (step S18). The HVECU 7 then returns the control routine.

In the first embodiment, the HVECU 7 starts the temperature reduction control routine for reducing the catalyst temperature when there is a request for engine power generation and the catalyst temperature is equal to or higher than a temperature reduction control temperature (the engine power generation amount is the engine power generation amount for the temperature reduction control). The temperature reduction control is triggered by input of a reduction in accelerator operation amount (the change in accelerator operation amount for deceleration $\Delta acc$>the predetermined amount A). When there is a reacceleration input or a vehicle speed maintaining input during the temperature reduction control, the HVECU 7 returns the engine operating point to such a reference engine operation line as will be described later, and performs the reference power generation control.

When the catalyst temperature becomes lower than the catalyst deactivation temperature faster than an expected temperature drop rate, the HVECU 7 returns the engine operating point to the reference engine operation line that is on the higher load side and performs the reference power generation control. For example, the catalyst temperature becomes lower than the catalyst deactivation temperature faster than the expected temperature drop rate when the time it takes until the engine 2 is stopped is increased due to a change in road load such as when traveling downhill, or when the catalyst tends to cool due to environmental factors such as outside air temperature and running wind. The temperature drop rate may be adjusted as appropriate in view of the above. The time it takes until the engine 2 is stopped may be determined as follows. For example, it is assumed that a user sets a destination in a car navigation system mounted on the series hybrid vehicle 1 and the user stops the engine 2 when he or she arrives at the destination and parks the series hybrid vehicle 1. In this case, the HVECU 7 may calculate expected travel time from the current position to the destination using map information, traffic congestion information, etc. and sets the time (period) it takes until the engine 2 is stopped to the calculated travel time. Alternatively, for example, the HVECU 7 may calculate the time it takes until the engine 2 is stopped according to the traveling state of the series hybrid vehicle 1. Specifically, based on the power balance between the amount of power generation of the power generation motor MG1 and the amount of power consumption of the drive motor MG2, the HVECU 7 may calculate the time it takes from input of a reduction in accelerator operation amount until power generation of the power generation motor MG1 is stopped so that the battery 6 is not overcharged. The HVECU 7 may set the time (period) it takes until the engine 2 is stopped to the calculated time. Alternatively, the HVECU 7 may calculate the time it takes from the current vehicle speed until the vehicle comes to a stop according to the road load on the series hybrid vehicle 1, and may set the time (period) it takes until the engine 2 is stopped to the calculated time.

The HVECU 7 starts the low load operation of the engine 2 when it determines that the catalyst temperature will not become lower than the catalyst deactivation temperature. In the case where the catalyst temperature is not lower than the catalyst deactivation temperature when the vehicle is stopped, the HVECU 7 continues the low load operation such as idling even after the vehicle is stopped. The low load operation of the engine 2 is thus performed while the vehicle is stopped. Accordingly, exhaust gas with a reduced temperature contacts the catalyst, whereby the catalyst temperature can be reduced to a temperature lower than the catalyst deactivation temperature.

Figure 3:
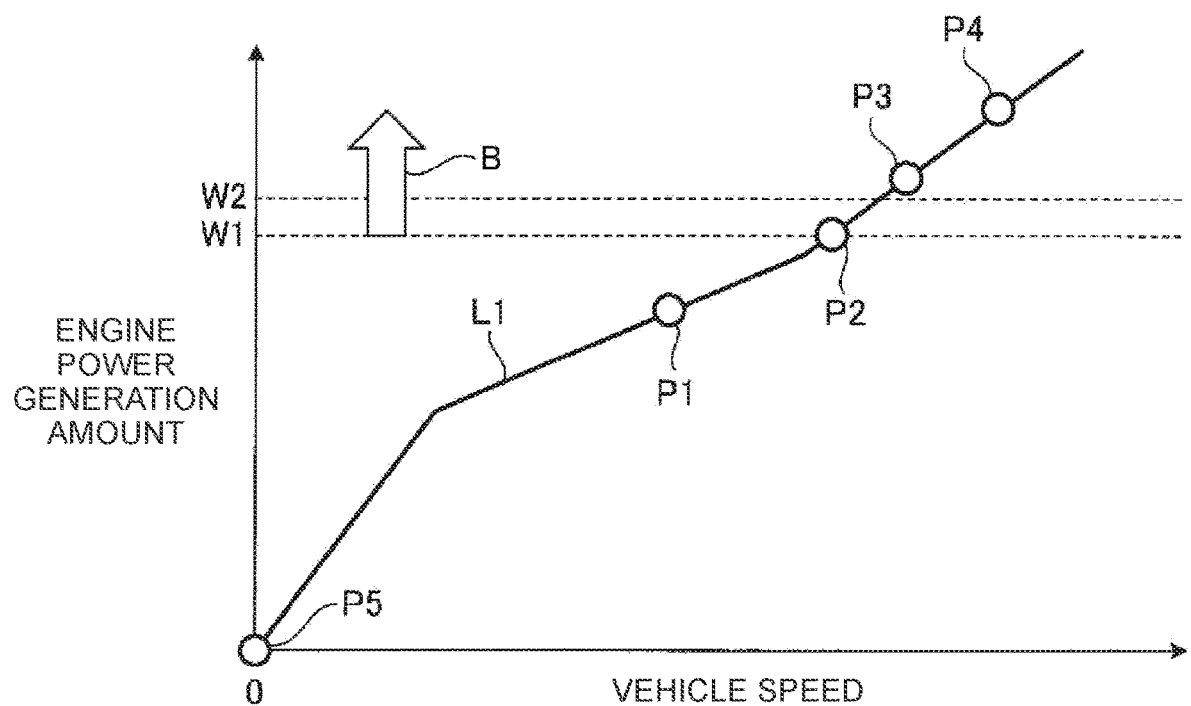
FIG. 3 illustrates an example of the relationship between the vehicle speed and the engine power generation amount in the first embodiment.

FIG. 3 illustrates an example of the relationship between the vehicle speed and the engine power generation amount in the first embodiment. FIG. 3 represents a two-dimensional map determined by the vehicle speed and the engine power generation amount. In FIG. 3, a power generation operation line L1 defined on the two-dimensional map is shown by a thick continuous line. In FIG. 3, W1 represents the engine power generation amount in the catalyst deactivation temperature range, and W2 represents the engine power generation amount for the temperature reduction control. In FIG. 3, the engine power generation amount is used as the catalyst temperature information, the engine power generation amount W1 is information corresponding to the catalyst temperature being the catalyst deactivation temperature, and the engine power generation amount W2 is information corresponding to the catalyst temperature being the temperature for the temperature reduction control. Arrow B in FIG. 3 indicates that the catalyst temperature is in the catalyst deactivation temperature range when the engine power generation amount is equal to or larger than the engine power generation amount W1.

As shown in FIG. 3, the engine power generation amount increases as the vehicle speed increases. Since the exhaust gas temperature increases as the engine power generation amount increases, the catalyst temperature also increases accordingly. The engine power generation amount decreases as the vehicle speed decreases. Since the exhaust gas temperature decreases as the engine power generation amount decreases, the catalyst temperature also decreases accordingly.

In the case where the current engine operating point is an operating point P1 on the power generation operation line L1 in FIG. 3, the engine power generation amount at the operating point P1 is smaller than the engine power generation amount W1 in the catalyst deactivation temperature range, and the catalyst temperature is therefore lower than the catalyst deactivation temperature. Since the catalyst temperature is lower than the catalyst deactivation temperature, the normal reference power generation control is performed at this operating point P1. In the case where the current engine operating point is an operating point P2 on the power generation operation line L1 in FIG. 3, the engine power generation amount at the operating point P2 is the engine power generation amount W1 in the catalyst deactivation temperature range. Accordingly, the catalyst temperature is equal to or higher than the catalyst deactivation temperature and is equal to or lower than the temperature for the temperature reduction control. Although the catalyst temperature is equal to or higher than the catalyst deactivation temperature, the temperature reduction control for reducing the catalyst temperature is not performed but the normal reference power generation control is performed at the operating point P2. In the case where the current engine operating point is an operating point P3, P4 on the power generation operation line L1 in FIG. 3, the engine power generation amount at the operating point P3, P4 is larger than both the engine power generation amount W1 in the catalyst deactivation temperature range and the engine power generation amount W2 for the temperature reduction control. Accordingly, the catalyst temperature is equal to or higher than the catalyst deactivation temperature and is equal to or higher than the temperature for the temperature reduction control. Since the catalyst temperature is equal to or higher than both the catalyst deactivation temperature and the temperature for the temperature reduction control, the temperature reduction control is performed at the operating point P3, P4 in order to reduce the catalyst temperature. In the case where the current operating point is an operating point P5 on the power generation operation line L1 in FIG. 3, the vehicle is stopped and the vehicle speed is 0 km/h. In this case, when the catalyst temperature is not lower than the catalyst deactivation temperature after the vehicle is stopped, the low load operation of the engine 2 such as idling is continued.

Next, an example will be described in which, when there is a request for engine power generation and the temperature reduction control for reducing the catalyst temperature is also required, there is an engine operating point that reduces the catalyst temperature (exhaust gas temperature) while maintaining the engine power generation amount.

Figure 4:
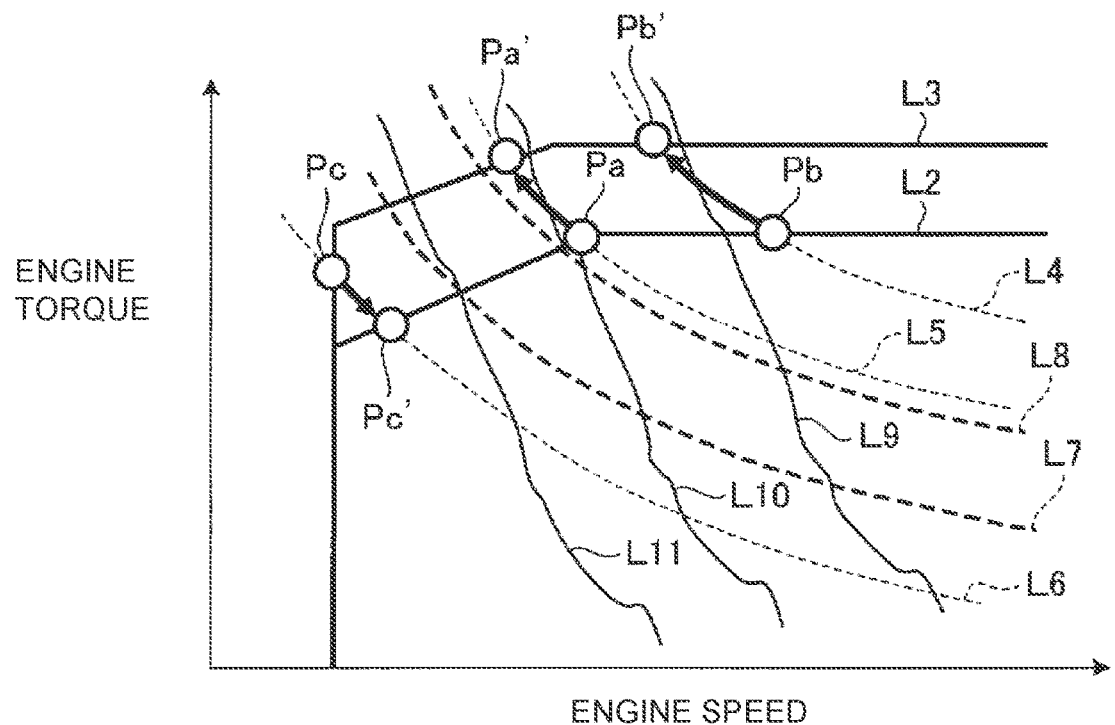
FIG. 4 is a map illustrating a change in engine operating point in the first embodiment.

FIG. 4 is a map illustrating a change in engine operating point in the first embodiment. FIG. 4 represents a two-dimensional map determined by the engine torque and the engine speed. In FIG. 4, a reference engine operation line L2 and a temperature reduction engine operation line L3 defined on the two-dimensional map are shown by thick continuous lines. Moreover, iso-output lines L4, L5, and L6 are shown by thin dashed lines, an engine power generation amount line L7 in the catalyst deactivation temperature range and an engine power generation amount line L8 for the temperature reduction control are shown by thick dashed lines, and iso-exhaust gas temperature lines L9, L10, and L11 are shown by thin continuous lines in FIG. 4. Each of the iso-output lines shows operating points that correspond to the same output of the engine. Each of the iso-exhaust gas temperature lines shows operating points that correspond to the same exhaust gas temperature of the engine. The iso-output lines L4, L5, and L6 have the relationship of L4>L5>L6 regarding the output, with the output on the iso-output line L4 the highest and the output on the iso-output line L6 the lowest. The iso-exhaust gas temperature lines L9, L10, and L11 have the relationship of L9>L10>L11 regarding the exhaust gas temperature, with the exhaust gas temperature on the iso-exhaust gas temperature line L9 the highest and the exhaust gas temperature on the iso-exhaust gas temperature line L11 the lowest.

Figure 5:
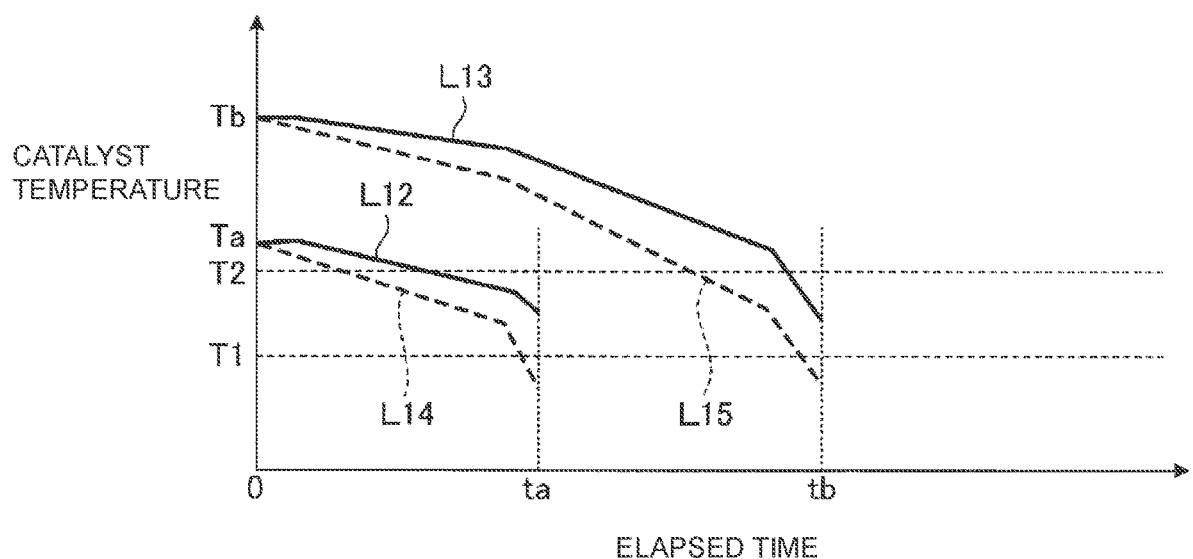
FIG. 5 illustrates an example of a change in catalyst temperature in the first embodiment.

FIG. 5 illustrates an example of a change in catalyst temperature in the first embodiment. Temperature reduction lines L12, L13 shown by thick continuous lines in FIG. 5 are the temperature reduction lines in the case where operating points Pa, Pb in FIG. 4 are moved along the reference engine operation line L2 in FIG. 4. Temperature reduction lines L14, L15 shown by thick dashed lines in FIG. 5 are the temperature reduction lines in the case where the operating points Pa, Pb in FIG. 4 are moved along the temperature reduction engine operation line L3 in FIG. 4. In FIG. 5, T1 represents the catalyst deactivation temperature, T2 represents the temperature for the temperature reduction control, Ta and Tb represent the catalyst temperatures at the operating points Pa, Pb in FIG. 4, and ta and tb represent the time it takes from the start of the temperature reduction control until the engine 2 is stopped for the operating points Pa, Pb in FIG. 4.

As shown in FIG. 4, the HVECU 7 controls the engine operating point when driving the engine 2. For example, when the vehicle is traveling in the steady state, the engine operating point is controlled to move along the reference engine operation line L2 that is an optimum fuel economy line. For example, when the accelerator operation amount is reduced while the vehicle is traveling in the steady state and the vehicle switches from the steady state to the decelerating state, the reference power generation control is performed during deceleration by moving the engine operating point along the reference engine operation line L2. The power generation motor MG1 thus generates electric power using the power from the engine 2.

In the first embodiment, for example, in the case where there is a request for engine power generation and the temperature reduction control for reducing the catalyst temperature is also necessary, the temperature reduction control is started when the accelerator operation amount is reduced while the vehicle is traveling in the steady state and the vehicle switches from the steady state to the decelerating state. The temperature reduction control is triggered by the reduction in accelerator operation amount. During the temperature reduction control, the engine operating point is changed from the reference engine operation line L2 to the temperature reduction engine operation line L3 that reduces the catalyst temperature to a temperature lower than the catalyst deactivation temperature by the time the engine 2 is stopped and that maintains the engine power generation amount. That is, the HVECU 7 reduces the exhaust gas temperature without changing the amount of power generation of the power generation motor MG1 (engine power generation amount). In this case, the HVECU 7 changes the engine operating point to an operating point that is the same in output of the engine 2 but is on the lower exhaust gas temperature side.

As shown in FIG. 4, in the case where the current engine operating point is the operating point Pa on the reference engine operation line L2, the HVECU 7 moves the operating point along the iso-output line L5 to the temperature reduction engine operation line L3 located on the side that reduces the exhaust gas temperature. As a result, the engine operating point is changed from the operating point Pa on the reference engine operation line L2 to an operating point Pa' on the temperature reduction engine operation line L3 located on the lower exhaust gas temperature side along the iso-output line L5. By thus changing the engine operating point from the operating point Pa on the reference engine operation line L2 to the operating point Pa' on the temperature reduction engine operation line L3 located on the lower exhaust gas temperature side along the iso-output line L5, the catalyst temperature can be reduced to a temperature lower than the catalyst deactivation temperature by the time the engine 2 is stopped as shown by the dashed line L14 in FIG. 5 while maintaining the engine power generation amount.

In the case where the current engine operating point is the operating point Pb on the reference engine operation line L2, the HVECU 7 moves the operating point to the temperature reduction engine operation line L3 located on the side that reduces the exhaust gas temperature along the iso-output line L4. As a result, the engine operating point is changed from the operating point Pb on the reference engine operation line L2 to an operating point Pb' on the temperature reduction engine operation line L3 located on the lower exhaust gas temperature side along the iso-output line L4. By thus changing the engine operating point from the operating point Pb on the reference engine operation line L2 to the operating point Pb' on the temperature reduction engine operation line L3 located on the lower exhaust gas temperature side along the iso-output line L4, the catalyst temperature can be reduced to a temperature lower than the catalyst deactivation temperature by the time the engine 2 is stopped as shown by the dashed line L15 in FIG. 5 while maintaining the engine power generation amount.

As can be seen from FIG. 4, the HVECU 7 changes the operating point from the operating point on the reference engine operation line L2 to such an operating point on the temperature reduction engine operation line L3 that reduces the engine speed and increases the engine torque so that the output at this operating point becomes equal to that at the operating point on the reference engine operation line L2. Accordingly, in order to increase the engine torque, the HVECU 7 reduces the exhaust gas temperature even by increasing the amount of fuel injection in the engine 2.

On the other hand, in the case where the current engine operating point is an operating point Pc on the temperature reduction engine operation line L3, the catalyst temperature is lower than the catalyst deactivation temperature, and the HVECU 7 moves the operating point to the reference engine operation line L2 along the iso-output line L6. As a result, the engine operating point is changed from the operating point Pc on the temperature reduction engine operation line L3 to an operating point Pc' on the reference engine operation line L2 along the iso-output line L6. By thus returning the engine operating point from the temperature reduction engine operation line L3 to the reference engine operation line L2, the engine 2 can be operated with optimum fuel economy.

When the vehicle speed is maintained to such an extent that the catalyst temperature is saturated, the engine power generation amount is associated with the catalyst temperature. However, when the vehicle speed is changing, the catalyst temperature follows the engine power generation amount with delay in time. Accordingly, the engine operation line prepared in view of this is used in this case. This engine operation line may be prepared in advance by experiments etc. and implemented in advance in the HVECU 7. It is desirable that the engine speed at the engine operating point for the temperature reduction control be lower than the current engine speed in order to provide sufficient NV performance. In the case where there is a reacceleration input or a vehicle speed maintaining input or the catalyst temperature becomes lower than the catalyst deactivation temperature during the temperature reduction control, the HVECU 7 returns the operating point from the temperature reduction engine operation line L3 to the reference engine operation line L2. In the case where the catalyst temperature is still not lower than the catalyst deactivation temperature at the time the HVECU 7 wants to stop the engine 2, the HVECU 7 prohibits the intermittent operation of the engine 2 and continues the low load operation of the engine 2. Accordingly, exhaust gas with a reduced temperature contacts the catalyst, whereby the catalyst temperature can be reduced to a temperature lower than the catalyst deactivation temperature.

Next, an example will be described in which, when there is a request for engine power generation and the temperature reduction control for reducing the catalyst temperature is also required, there is no engine operating point that reduces the catalyst temperature (exhaust gas temperature) while maintaining the engine power generation amount. In other words, this is an example in which, when there is a request for engine power generation and the temperature reduction control for reducing the catalyst temperature is also required, an engine operating point is selected which reduces the engine power generation amount and reduces the catalyst temperature (exhaust gas temperature).

Figure 6:
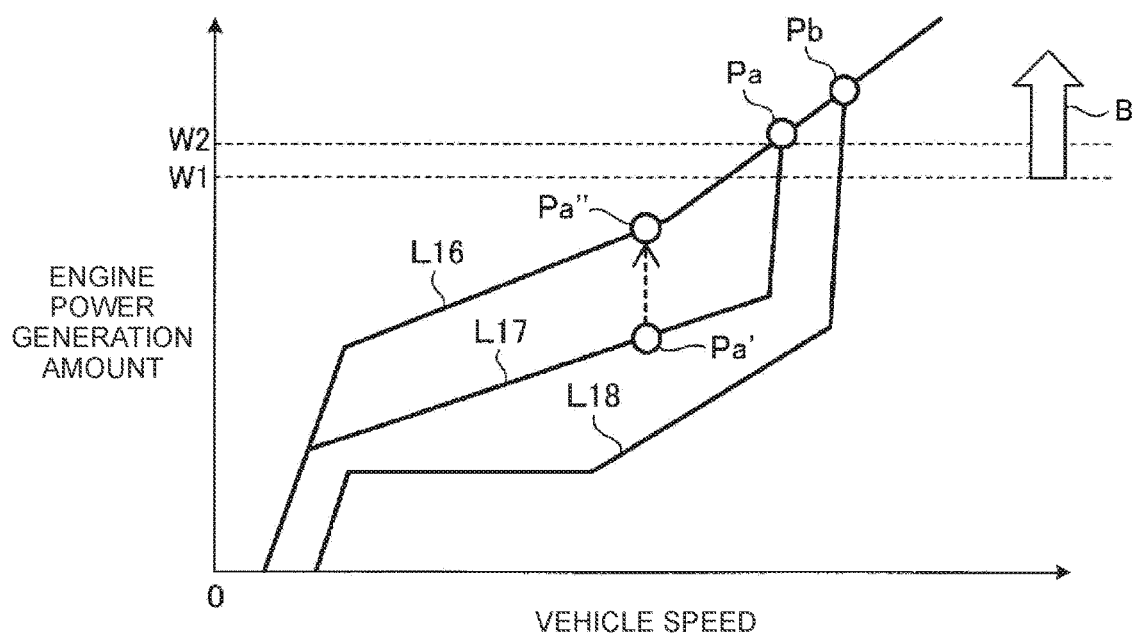
FIG. 6 illustrates another example of the relationship between the vehicle speed and the engine power generation amount in the first embodiment.

FIG. 6 illustrates another example of the relationship between the vehicle speed and the engine power generation amount in the first embodiment. FIG. 6 represents a two-dimensional map determined by the vehicle speed and the engine power generation amount. In FIG. 6, the engine power generation amount is used as the catalyst temperature information, the engine power generation amount W1 is information corresponding to the catalyst temperature being the catalyst deactivation temperature, and the engine power generation amount W2 is information corresponding to the catalyst temperature being the temperature for the temperature reduction control. Arrow B in FIG. 6 indicates that the catalyst temperature is in the catalyst deactivation temperature range when the engine power generation amount is equal to or larger than the engine power generation amount W1.

Power generation operation lines L16, L17, and L18 shown by thick continuous lines in FIG. 6 are power generation operation lines defined on the two-dimensional map. On the power generation operation lines L16, L17, and L18, the engine power generation amount is maintained or increased with an increase in vehicle speed. The power generation operation lines L16, L17, and L18 have the relationship of L18<L17<L16 regarding the engine power generation amount at the same vehicle speed, with the engine power generation amount on the power generation operation line L16 the largest and the engine power generation amount on the power generation operation line L18 the smallest at the same vehicle speed. In FIG. 6, no power generation (engine power generation amount=0 kw) is not limited to the time when the vehicle is stopped. The HVECU 7 may set a plurality of power generation operation lines as a power generation operation area and select this area. This makes it possible to easily change the engine operating point to an engine operating point that reduces the catalyst temperature (exhaust gas temperature) while maintaining the engine power generation amount. The power generation operation lines L16, L17, and L18 are selected according to the SOC of the battery 6 so that the lower the SOC of the battery 6, the larger the engine power generation amount.

In the case where there is a request for engine power generation and the temperature reduction control is also necessary, the temperature reduction control is started. The temperature reduction control is triggered by a reduction in accelerator operation amount. During the temperature reduction control, the engine operating point is changed to the power generation operation line that reduces the catalyst temperature to a temperature lower than the catalyst deactivation temperature by the time the engine 2 is stopped and that maximizes power generation. It is herein assumed that the engine operating point moves on the reference engine operation line L2 in FIG. 4.

With reference to FIG. 6, an example will be described in which the catalyst temperature will not be reduced to a temperature lower than the catalyst deactivation temperature by the time the engine 2 is stopped unless the engine power generation amount is reduced more than in the case where the engine operating point is moved along the power generation operation line L16. Although the three power generation operation lines L16, L17, and L18 are shown in FIG. 6, the power generation operation lines are not limited to these. The HVECU 7 selects the power generation operation line along which the engine operating point is moved, according to the catalyst temperature at the time a deceleration input is applied to the vehicle.

As shown in FIG. 6, in the case where the current engine operating point is an operating point Pa on the power generation operation line L16, the HVECU 7 moves the operating point Pa along the power generation operation line L17 that reduces the engine power generation amount more than the power generation operation line L16. By thus moving the operating point Pa along the power generation operation line L17, the engine power generation amount can be reduced more than in the case where the operating point Pa is moved along the power generation operation line L16, and the exhaust gas temperature can be reduced accordingly. The catalyst temperature can therefore be reduced to a temperature lower than the catalyst deactivation temperature by the time the engine 2 is stopped.

As shown in FIG. 6, in the case where the current engine operating point is an operating point Pb on the power generation operation line L16, the HVECU 7 moves the operating point Pb on the power generation operation line L18 that reduces the engine power generation amount more than the power generation operation line L16. By thus moving the operating point Pb on the power generation operation line L18, the engine power generation amount can be reduced more than in the case where the operating point Pb is moved along the power generation operation line L16, and the exhaust gas temperature can be reduced accordingly. The catalyst temperature can therefore be reduced to a temperature lower than the catalyst deactivation temperature by the time the engine 2 is stopped.

As shown in FIG. 6, when the operating point Pa is moved along the power generation operation line L17 with a decrease in vehicle speed and there is a reacceleration input to the vehicle at an operating point Pa', the HVECU 7 moves the operating point Pa' from the power generation operation line L17 to the power generation operation line L16. As a result, the engine operating point is changed from the operating point Pa' on the power generation operation line L17 to an operating point Pa'' on the power generation operation line L16. The engine power generation amount is thus maximized by thus returning the engine operating point from the power generation operation line L17 to the power generation operation line L16 that increases the engine power generation amount more than the power generation operation line L17.

Figure 7:
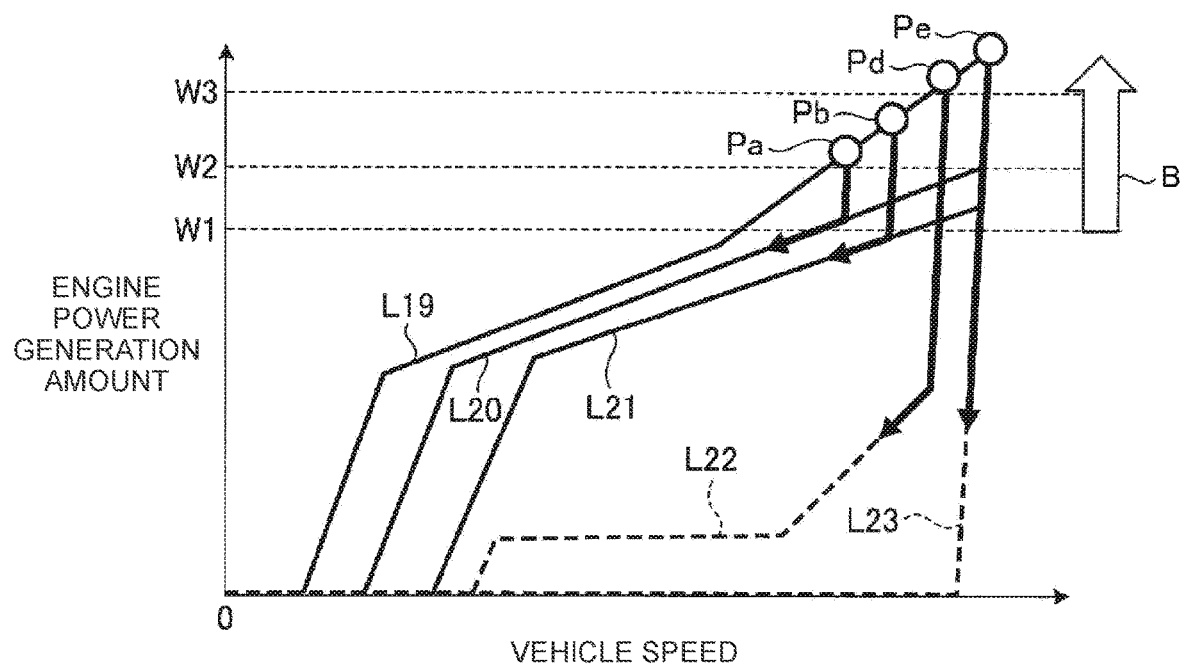
FIG. 7 illustrates still another example of the relationship between the vehicle speed and the engine power generation amount in the first embodiment.

FIG. 7 illustrates still another example of the relationship between the vehicle speed and the engine power generation amount in the first embodiment. FIG. 7 represents a two-dimensional map determined by the vehicle speed and the engine power generation amount. In FIG. 7, the engine power generation amount is used as the catalyst temperature information, the engine power generation amount W1 is information corresponding to the catalyst temperature being the catalyst deactivation temperature, the engine power generation amount W2 is information corresponding to the catalyst temperature being the temperature for the temperature reduction control, and the engine power generation amount W3 is information corresponding to the catalyst temperature being a second temperature for the temperature reduction control. Arrow B in FIG. 7 indicates that the catalyst temperature is in the catalyst deactivation temperature range when the engine power generation amount is equal to or larger than the engine power generation amount W1.

Power generation operation lines L19, L20, and L21 shown by thick continuous lines in FIG. 7 are power generation operation lines defined on the two-dimensional map. On the power generation operation lines L19, L20, and L21, the engine power generation amount is maintained or increased with an increase in vehicle speed. Referring to FIG. 7, the power generation operation lines L19, L20, and L21 have the relationship of L19>L20>L21 regarding the engine power generation amount at the same vehicle speed, with the engine power generation amount on the power generation operation line L19 the largest and the engine power generation amount on the power generation operation line L21 the smallest at the same vehicle speed. The power generation operation lines L19, L20, and L21 are selected according to the SOC of the battery 6 so that the lower the SOC of the battery 6, the larger the engine power generation amount. Power generation operation lines L22, L23 shown by thick dashed lines in FIG. 7 are power generation operation lines exclusively for the temperature reduction control for reducing the catalyst temperature. In FIG. 7, it is assumed that the engine operating point moves on the reference engine operation line L2 in FIG. 4.

Figure 8:
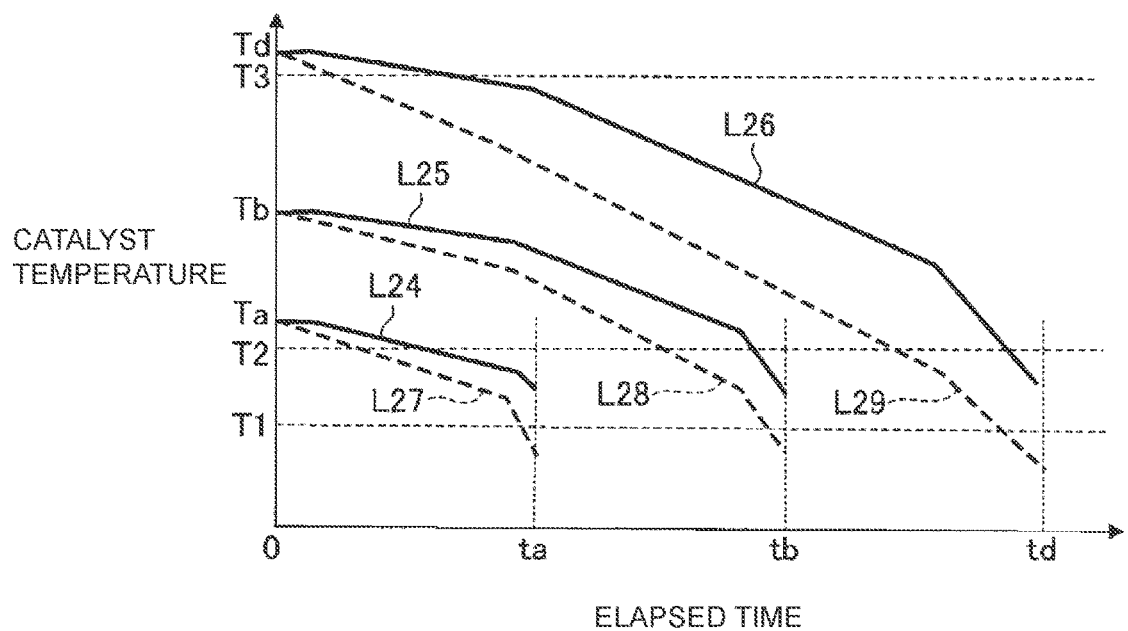
FIG. 8 illustrates another example of a change in catalyst temperature in the first embodiment.

FIG. 8 illustrates another example of a change in catalyst temperature in the first embodiment. Temperature reduction lines L24, L25, and L26 shown by thick continuous lines in FIG. 8 are the temperature reduction lines in the case where operating points Pa, Pb, and Pd in FIG. 7 are moved along the power generation operation line L19 in FIG. 7. Temperature reduction lines L27, L28, and L29 shown by thick dashed lines in FIG. 8 are the temperature reduction lines in the case where the operating points Pa, Pb, and Pd in FIG. 7 are moved along the power generation operation lines L20, L21, and L22 in FIG. 7. In FIG. 8, T1 represents the catalyst deactivation temperature, T2 represents the temperature for the temperature reduction control, T3 represents the second temperature for the temperature reduction control, Ta, Tb, and Td represent the catalyst temperatures at the operating points Pa, Pb, and Pd in FIG. 7, and ta, tb, and td represent the time it takes from the start of the temperature reduction control until the engine 2 is stopped for the operating points Pa, Pb, and Pd in FIG. 7.

The HVECU 7 selects the power generation operation line as follows during the temperature reduction control. The HVECU 7 selects the power generation operation line L20 when the engine power generation amount at the current engine operating point is equal to or smaller than that at the operating point Pa. The HVECU 7 selects the power generation operation line L21 when the engine power generation amount at the current engine operating point is larger than that at the operating point Pa and equal to or smaller than that at the operating point Pb. The HVECU 7 selects the power generation operation line L22 exclusively for the temperature reduction control when the engine power generation amount at the current engine operating point is larger than that at the operating point Pb and equal to or smaller than that at the operating point Pd. The HVECU 7 selects the power generation operation line L23 exclusively for the temperature reduction control when the engine power generation amount at the current engine operating point is larger than that at the operating point Pd and equal to or smaller than that at an operating point Pe.

As described above, in FIG. 7, the HVECU 7 selects the power generation operation lines L22, L23 exclusively for the temperature reduction control when the engine power generation amount becomes equal to or larger than the engine power generation amount W3 that is a second engine power generation amount for the temperature reduction control and that is larger than the engine power generation amount W2 for the temperature reduction control by a predetermined amount. That is, when the engine operating point is at the second temperature for the temperature reduction control higher than the temperature for the temperature reduction control, the HVECU 7 selects the power generation operation lines L22, L23 for the temperature reduction control that significantly reduces the engine power generation amount as compared to the power generation operation lines L19, L20, and L21. By thus moving the engine operating point on the power generation operation lines L22, L23, the exhaust gas temperature can be significantly reduced as compared to the case where the engine operating point is moved along the power generation operation lines L19, L20, L21, and the catalyst temperature can be reduced to a temperature lower than the catalyst deactivation temperature by the time the engine 2 is stopped.

For example, as shown in FIG. 7, in the case where the current engine operating point is the operating point Pd on the reference engine operation line L2, the HVECU 7 moves the engine operating point on the power generation operation line L22 exclusively for the temperature reduction control during the temperature reduction control. The exhaust gas temperature can thus be significantly reduced as compared to the case where the operating point Pd is moved along the power generation operation line L19, and as shown by the temperature reduction line L29 in FIG. 8, the catalyst temperature can be reduced to a temperature lower than the catalyst deactivation temperature by the time the engine 2 is stopped.

Figure 9:
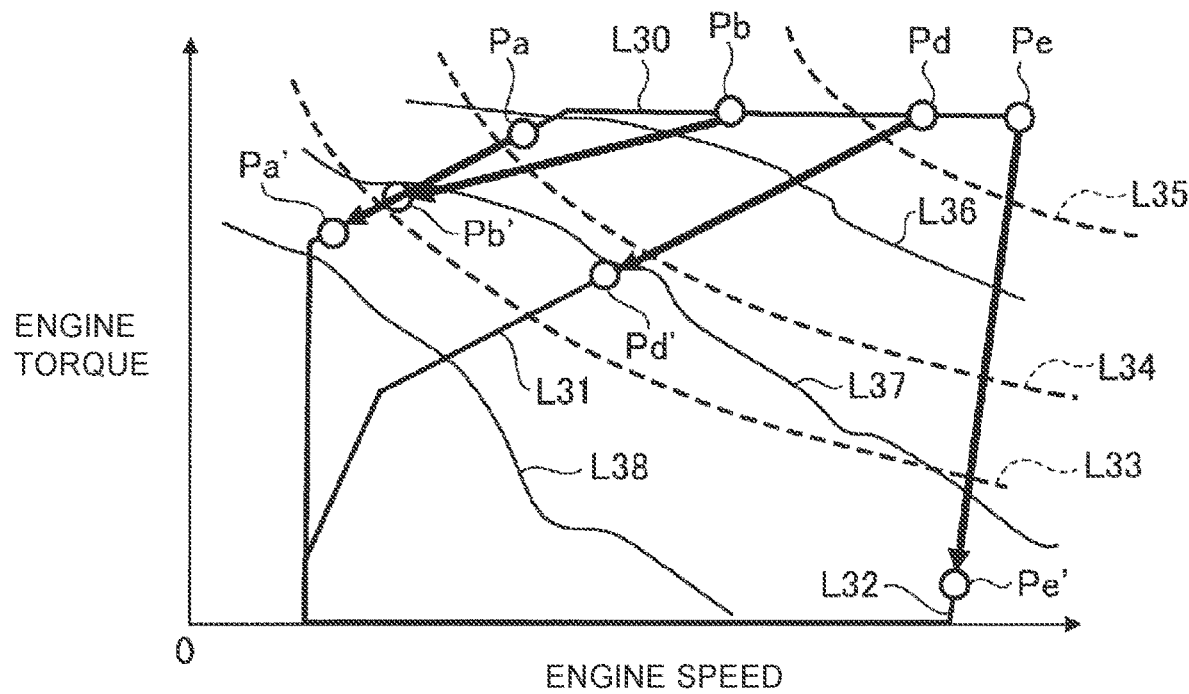
FIG. 9 is a map illustrating a change in engine operating point in the first embodiment.

FIG. 9 is a map illustrating a change in engine operating point in the first embodiment. FIG. 9 represents a two-dimensional map determined by the engine torque and the engine speed. In FIG. 9, a reference engine operation line L30 and temperature reduction engine operation lines L31, L32 defined on the two-dimensional map are shown by thick continuous lines. Moreover, an engine power generation amount line L33 in the catalyst deactivation temperature range, an engine power generation amount line L34 for the temperature reduction control, and an engine power generation amount line L35 that is a second engine power generation amount line for the temperature reduction control are shown by thick dashed lines, and iso-exhaust gas temperature lines L36, L37, and L38 are shown by thin continuous lines in FIG. 9. The iso-exhaust gas temperature lines L36, L38, and L38 have the relationship of L36>L37>L38 regarding the exhaust gas temperature, with the exhaust gas temperature on the iso-exhaust gas temperature line L36 the highest and the exhaust gas temperature on the iso-exhaust gas temperature line L38 the lowest. The reference engine operation line L30 is set as an engine operation line with as low rotation and high load (high torque) as possible for the NV performance. On the temperature reduction engine operation lines L31, L32, the engine operating point is moved so that the current engine speed is reduced or both the current engine speed and the current engine torque are reduced.

As shown in FIG. 9, in the case where the current engine operating point is an operating point Pa on the reference engine operation line L30, the HVECU 7 moves the operating point along the reference engine operation line L30 to the side that reduces the exhaust gas temperature. As a result, the engine operating point is changed along the reference engine operation line L30 from the operating point Pa to an operating point Pa' on the lower exhaust gas temperature side. By thus changing the engine operating point along the reference engine operation line L30 from the operating point Pa to the operating point Pa' on the lower exhaust gas temperature side, the engine power generation amount is reduced and the exhaust gas temperature is thus reduced, whereby the catalyst temperature can be reduced to a temperature lower than the catalyst deactivation temperature by the time the engine 2 is stopped.

As shown in FIG. 9, in the case where the current engine operating point is an operating point Pb on the reference engine operation line L30, the HVECU 7 moves the operating point along the reference engine operation line L30 to the side that reduces the exhaust gas temperature. As a result, the engine operating point is changed along the reference engine operation line L30 from the operating point Pb to an operating point Pb' on the lower exhaust gas temperature side. By thus changing the engine operating point along the reference engine operation line L30 from the operating point Pb to the operating point Pb' on the lower exhaust gas temperature side, the engine power generation amount is reduced and the exhaust gas temperature is thus reduced, whereby the catalyst temperature can be reduced to a temperature lower than the catalyst deactivation temperature by the time the engine 2 is stopped.

As shown in FIG. 9, in the case where the current engine operating point is an operating point Pd on the reference engine operation line L30, the HVECU 7 moves the operating point along the temperature reduction engine operation line L31 to the side that reduces the exhaust gas temperature. As a result, the engine operating point is changed from the operating point Pd on the reference engine operation line L30 to an operating point Pd' on the lower exhaust gas temperature side on the temperature reduction engine operation line L31. By thus changing the engine operating point from the operating point Pd on the reference engine operation line L30 to the operating point Pd' on the temperature reduction engine operation line L31, the engine power generation amount is significantly reduced and the exhaust gas temperature is further reduced, whereby the catalyst temperature can be reduced to a temperature lower than the catalyst deactivation temperature by the time the engine 2 is stopped.

As shown in FIG. 9, in the case where the current engine operating point is an operating point Pe on the reference engine operation line L30, the HVECU 7 moves the operating point along the temperature reduction engine operation line L32 to the side that reduces the exhaust gas temperature. As a result, the engine operating point is changed from the operating point Pe on the reference engine operation line L30 to an operating point Pe' on the lower exhaust gas temperature side on the temperature reduction engine operation line L32. By thus changing the engine operating point from the operating point Pe on the reference engine operation line L30 to the operating point Pe' on the temperature reduction engine operation line L32, the engine power generation amount is significantly reduced and the exhaust gas temperature is further reduced, whereby the catalyst temperature can be reduced to a temperature lower than the catalyst deactivation temperature by the time the engine 2 is stopped.

In the case where the catalyst temperature is the second temperature for the temperature reduction control that is particularly high in the catalyst deactivation temperature range, such as at the operating points Pd, Pe, the exhaust gas temperature can be reduced more quickly and the catalyst temperature can be more effectively reduced by reducing the engine speed while reducing the throttle valve opening degree (i.e., while reducing the engine torque) on the temperature reduction engine operation lines L31, L32 from the start of the temperature reduction control than by reducing only the engine speed. On the temperature reduction engine operation lines L31, L32, the engine speed is reduced while reducing the throttle valve opening degree and reducing the engine torque. However, since actual changes in engine torque and engine speed are instantaneous, it feels to the driver that the changes in engine torque and engine speed occur subsequently at the same time.

In FIG. 9, the operating points have the relationship of $\Delta T(a \rightarrow a') < \Delta T(b \rightarrow b') < \Delta T(d \rightarrow d')$ regarding the difference in catalyst temperature, where $\Delta T(a \rightarrow a')$ is the difference in catalyst temperature between the operating point Pa and the operating point Pa', $\Delta T(b \rightarrow b')$ is the difference in catalyst temperature between the operating point Pb and the operating point Pb', and $\Delta T(d \rightarrow d')$ is the difference in catalyst temperature between the operating point Pd and the operating point Pd'.

The power generation operation for reducing the catalyst temperature while reducing the engine power generation amount is not limited to the second catalyst temperature range in FIG. 7, but may be performed using a combination of the temperature reduction control in FIG. 6 and the temperature reduction engine operation lines in FIG. 9.

Second Embodiment

A second embodiment of the power generation control device according to the disclosure will be described. In the second embodiment, the same description as that of the first embodiment will be omitted as appropriate.

Figure 10:
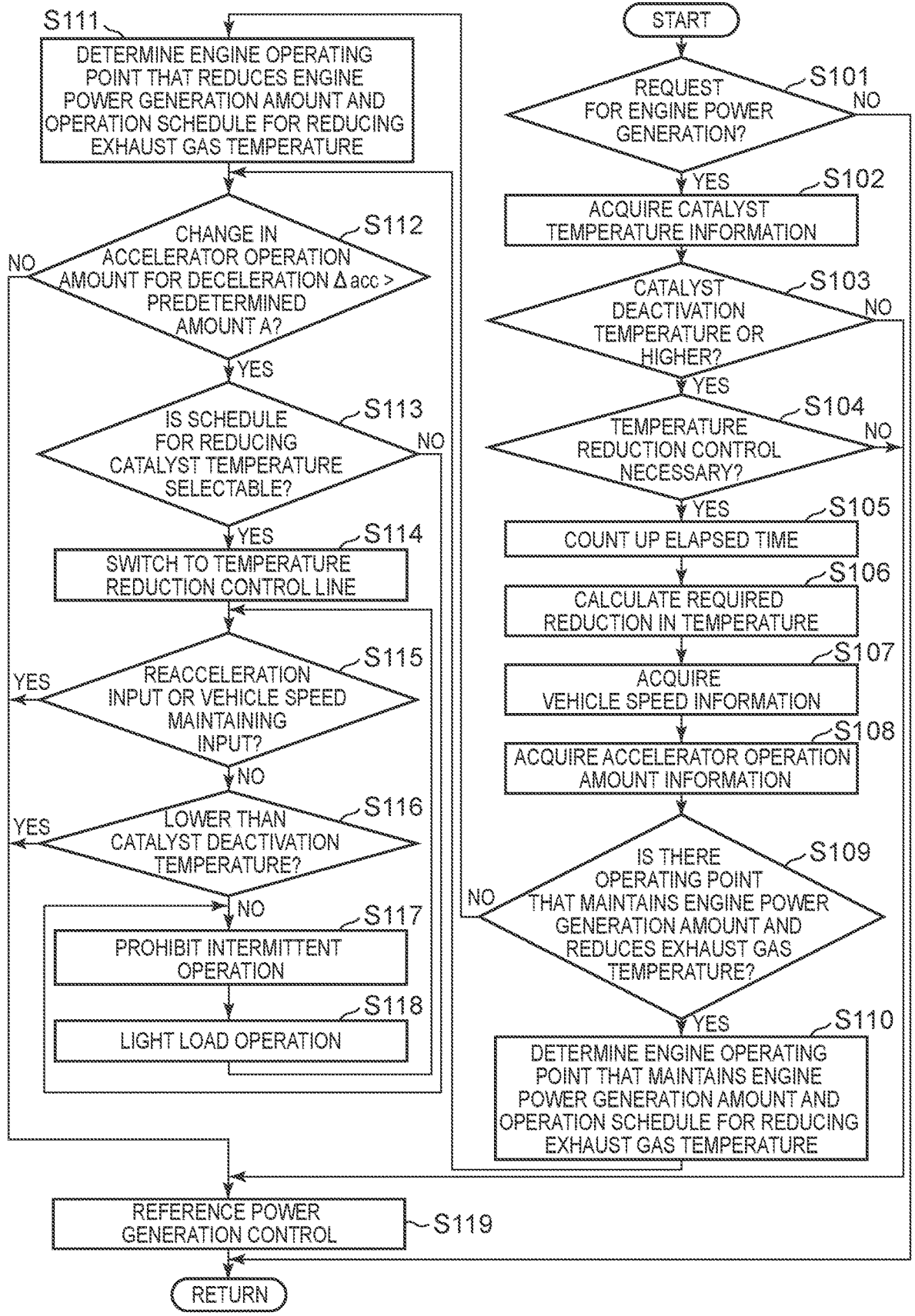
FIG. 10 is a flowchart illustrating an example of power generation control in a second embodiment.

FIG. 10 is a flowchart illustrating an example of power generation control in the second embodiment. The flowchart of the power generation control shown in FIG. 10 is different from the flowchart of the power generation control shown in FIG. 2 in that the duration of the engine operation is considered in the situation where the temperature reduction control for reducing the catalyst temperature is necessary. According to the states of the catalyst temperature and the engine output, not only the sensing point for the catalyst temperature but also the temperature state of the entire catalyst are estimated and a required reduction in catalyst temperature is calculated to select the power generation operation line.

First, the HVECU 7 determines whether there is a request for engine power generation (step S101). When the HVECU 7 determines that there is no request for engine power generation (No in step S101), the HVECU 7 returns the control routine. When the HVECU 7 determines that there is a request for engine power generation (Yes in step S101), the HVECU 7 acquires catalyst temperature information (step S102). The HVECU 7 subsequently acquires the catalyst temperature information as necessary.

Next, the HVECU 7 determines whether the catalyst temperature is equal to or higher than the catalyst deactivation temperature (step S103). When the HVECU 7 determines that the catalyst temperature is not equal to or higher the catalyst deactivation temperature (No in step S103), the HVECU 7 performs the reference power generation control (step S119). The HVECU 7 then returns the control routine. When the HVECU 7 determines that the catalyst temperature is equal to or higher than the catalyst deactivation temperature (Yes in step S103), the HVECU 7 determines whether the temperature reduction control is necessary (step S104). When the HVECU 7 determines that the temperature reduction control is not necessary (No in step S104), the HVECU 7 performs the reference power generation control (step S119). The HVECU 7 then returns the control routine. When the HVECU 7 determines that the temperature reduction control is necessary (Yes in step S104), the HVECU 7 counts up the elapsed time during which the operation of the engine 2 has continued since it was determined that the temperature reduction control was necessary (step S105). The HVECU 7 then calculates a required reduction in catalyst temperature (step S106). Thereafter, the HVECU 7 acquires vehicle speed information (step S107) and then acquires accelerator operation amount information (step S108).

Subsequently, the HVECU 7 determines whether there is an engine operating point that maintains the engine power generation amount and reduces the exhaust gas temperature (step S109). When the HVECU 7 determines that there is an engine operating point that maintains the engine power generation amount and reduces the exhaust gas temperature (Yes in step S109), the HVECU 7 determines the engine operating point that maintains the engine power generation amount and an operation schedule for reducing the exhaust gas temperature (step S110). The HVECU 7 then proceeds to step S112. When the HVECU 7 determines that there is no engine operating point that maintains the engine power generation amount and reduces the exhaust gas temperature (No in step S109), the HVECU 7 determines an engine operating point that reduces the engine power generation amount and an operation schedule for reducing the exhaust gas temperature (step S111). The HVECU 7 then proceeds to step S112.

Thereafter, the HVECU 7 determines whether "the change in accelerator operation amount for deceleration Δacc>the predetermined amount A" is satisfied (step S112). When the HVECU 7 determines that "the change in accelerator operation amount for deceleration Δacc>the predetermined amount A" is not satisfied (No in step S112), the HVECU 7 performs the reference power generation control (step S119). The HVECU 7 then returns the control routine. When the HVECU 7 determines that "the change in accelerator operation amount for deceleration Δacc>the predetermined amount A" is satisfied (Yes in step S112), the HVECU 7 determines whether a schedule for reducing the catalyst temperature is selectable (step S113). When the HVECU 7 determines that the schedule for reducing the catalyst temperature is selectable (Yes in step S113), the HVECU 7 switches to the temperature reduction control line (step S114).

Subsequently, the HVECU 7 determines whether there is a reacceleration input or a vehicle speed maintaining input (step S115). When the HVECU 7 determines that there is neither a reacceleration input nor a vehicle speed maintaining input (No in step S115), the HVECU 7 determines whether the catalyst temperature is lower than the catalyst deactivation temperature (step S116). When the HVECU 7 determines that the catalyst temperature is not lower than the catalyst deactivation temperature (No in step S116), the HVECU 7 proceeds to step S117. When the HVECU 7 determines in step S113 that the schedule for reducing the catalyst temperature is not selectable (No in step S113), the HVECU 7 proceeds to step S117. The HVECU 7 then prohibits intermittent operation of the engine 2 (step S117) and thereafter performs low load operation of the engine 2 (step S118). The HVECU 7 then proceeds to step S115.

When the HVECU 7 determines in step S115 that there is a reacceleration input or a vehicle speed maintaining input (Yes in step S115), the HVECU 7 performs the reference power generation control (step S119). The HVECU 7 then returns the control routine. When the HVECU 7 determines in step S116 that the catalyst temperature is lower than the catalyst deactivation temperature (Yes in step S116), the HVECU 7 performs the reference power generation control (step S119). The HVECU 7 then returns the control routine.

According to the second embodiment, since the temperature distribution in the entire catalyst varies depending on how long the catalyst is exposed to exhaust gas, not only the temperature around the sensor but also how much the entire catalyst is saturated are determined to select the power generation operation line. A more accurate temperature reduction operation schedule can thus be determined.

That is, in the second embodiment, in the case where there is a request for engine power generation and the temperature reduction control for reducing the catalyst temperature is also necessary, the temperature reduction control is started. The temperature reduction control is triggered by a reduction in accelerator operation amount. During the temperature reduction control, when the exhaust gas temperature (catalyst temperature) will not be reduced unless the engine power generation amount is reduced by the time the engine 2 is stopped, an accurate power generation operation line is set according to how long the engine operating point has been maintained.

Figure 11:
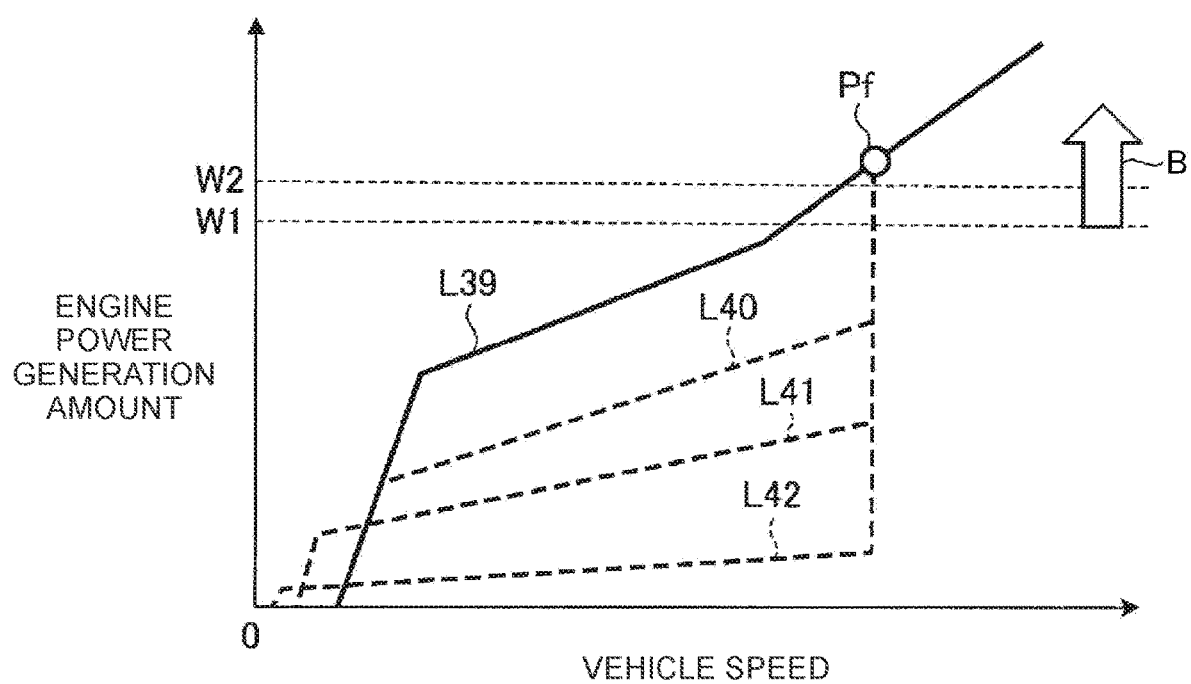
FIG. 11 illustrates an example of power generation operation lines in the second embodiment.

FIG. 11 illustrates an example of power generation operation lines in the second embodiment. FIG. 11 represents a two-dimensional map determined by the vehicle speed and the engine power generation amount. In FIG. 11, the engine power generation amount is used as the catalyst temperature information, the engine power generation amount W1 is information corresponding to the catalyst temperature being the catalyst deactivation temperature, and the engine power generation amount W2 is information corresponding to the catalyst temperature being the temperature for the temperature reduction control. Arrow B in FIG. 11 indicates that the catalyst temperature is in the catalyst deactivation temperature range when the engine power generation amount is equal to or larger than the engine power generation amount W1. A power generation operation line L39 shown by a thick continuous line in FIG. 11 is a power generation operation line defined on the two-dimensional map. On the power generation operation line L39, the engine power generation amount increases with an increase in vehicle speed. Power generation operation lines L40, L41, and L42 shown by thick dashed lines in FIG. 11 are power generation operation lines exclusively for the temperature reduction control for reducing the catalyst temperature.

In FIG. 11, in the case where the current engine operating point is an operating point Pf on the power generation operation line L39 where the engine power generation amount is equal to or larger than the engine power generation amount W2 for the temperature reduction control, the longer the operating point Pf has been maintained, the longer the catalyst has been exposed to high temperature exhaust gas, whereby the catalyst temperature becomes high. Accordingly, in the temperature reduction control for reducing the catalyst temperature, it is desirable to reduce the exhaust gas temperature by operating the engine 2 at such an engine operating point that the engine power generation amount decreases as the time during which the operating point Pf has been maintained increases. As shown in FIG. 11, the power generation operation lines L40, L41, and L42 exclusively for the temperature reduction control for reducing the catalyst temperature have the relationship of L40>L41>L42 regarding the engine power generation amount at the same vehicle speed, with the engine power generation amount on the power generation operation line L40 the largest and the engine power generation amount on the power generation operation line L42 the smallest at the same vehicle speed. The power generation operation lines L40, L41, and L42 therefore have the relationship of L40>L41>L42 regarding the exhaust gas temperature, with the exhaust gas temperature on the power generation operation line L40 the highest and the exhaust gas temperature on the power generation operation line L42 the lowest.

Accordingly, in the case where the current engine operating point is the operating point Pf on the power generation operation line L39, the HVECU 7 selects the power generation operation line depending on how long the operating point Pf has been maintained. For example, the HVECU 7 selects the power generation operation line L42 when the operating point Pf has been maintained for less than a first predetermined time, selects the power generation operation line L41 when the operating point Pf has been maintained for the first predetermined time or more and less than a second predetermined time (<first predetermined time), and selects the power generation operation line L40 when the operating point Pf has been maintained for the second time or more. The power generation operation line that can reduce the catalyst temperature to a temperature lower than the catalyst deactivation temperature by the time the engine 2 is stopped can be accurately set according to how long the operating point Pf has been maintained.

The HVECU 7 may calculate a temperature reduction level based on how long the operating point Pf has been maintained and determine the power generation operation lines L40, L41, L42 exclusively for the temperature reduction control for reducing the catalyst temperature (power generation operation line to be used when there is a deceleration input) according to the calculated temperature reduction level.

Third Embodiment

A third embodiment of the power generation control device according to the disclosure will be described. In the third embodiment, the same description as that of the first embodiment will be omitted as appropriate.

Figure 12:
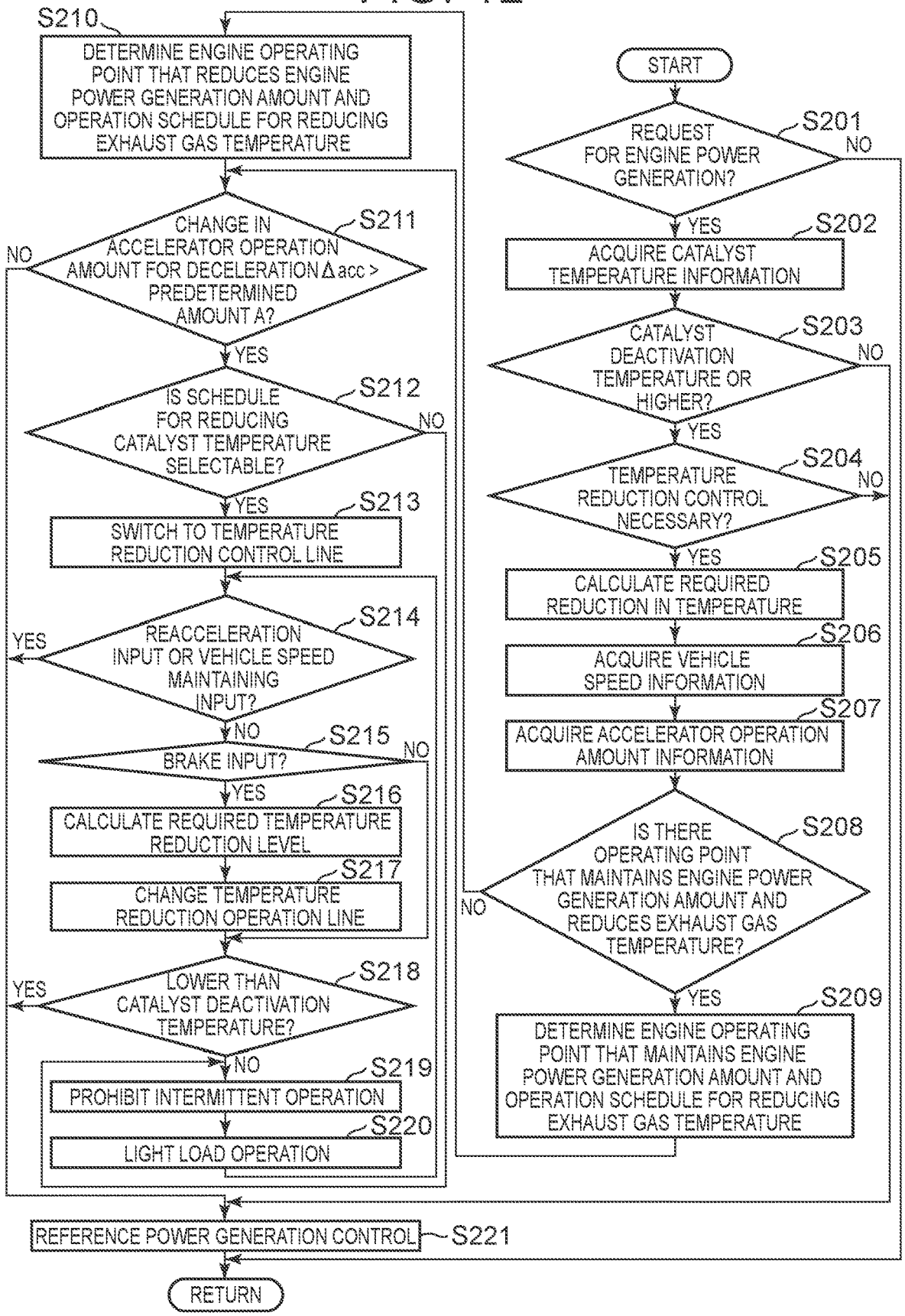
FIG. 12 is a flowchart illustrating an example of power generation control in a third embodiment.

FIG. 12 is a flowchart illustrating an example of power generation control in the third embodiment. The flowchart of the power generation control shown in FIG. 12 is different from the flowchart of the power generation control of the first embodiment shown in FIG. 2 in that when there is a brake input during deceleration of the vehicle, the required reduction in catalyst temperature is reconsidered and the power generation operation line is changed to the lower load side because it is necessary to increase the temperature drop rate.

First, the HVECU 7 determines whether there is a request for engine power generation (step S201). When the HVECU 7 determines that there is no request for engine power generation (No in step S201), the HVECU 7 returns the control routine. When the HVECU 7 determines that there is a request for engine power generation (Yes in step S201), the HVECU 7 acquires catalyst temperature information (step S202). The HVECU 7 subsequently acquires the catalyst temperature information as necessary.

Next, the HVECU 7 determines whether the catalyst temperature is equal to or higher than the catalyst deactivation temperature (step S203). When the HVECU 7 determines that the catalyst temperature is not equal to or higher the catalyst deactivation temperature (No in step S203), the HVECU 7 performs the reference power generation control (step S221). The HVECU 7 then returns the control routine. When the HVECU 7 determines that the catalyst temperature is equal to or higher than the catalyst deactivation temperature (Yes in step S203), the HVECU 7 determines whether the temperature reduction control is necessary (step S204). When the HVECU 7 determines that the temperature reduction control is not necessary (No in step S204), the HVECU 7 performs the reference power generation control (step S221). The HVECU 7 then returns the control routine. When the HVECU 7 determines that the temperature reduction control is necessary (Yes in step S204), the HVECU 7 calculates a required reduction in catalyst temperature (step S205). The HVECU 7 then acquires vehicle speed information (step S206). Thereafter, the HVECU 7 acquires accelerator operation amount information (step S207).

Subsequently, the HVECU 7 determines whether there is an engine operating point that maintains the engine power generation amount and reduces the exhaust gas temperature (step S208). When the HVECU 7 determines that there is an engine operating point that maintains the engine power generation amount and reduces the exhaust gas temperature (Yes in step S208), the HVECU 7 determines the engine operating point that maintains the engine power generation amount and an operation schedule for reducing the exhaust gas temperature (step S209). The HVECU 7 then proceeds to step S211. When the HVECU 7 determines that there is no engine operating point that maintains the engine power generation amount and reduces the exhaust gas temperature (No in step S208), the HVECU 7 determines an engine operating point that reduces the engine power generation amount and an operation schedule for reducing the exhaust gas temperature (step S210). The HVECU 7 then proceeds to step S211.

Thereafter, the HVECU 7 determines whether "the change in accelerator operation amount for deceleration Δacc>the predetermined amount A" is satisfied (step S211). When the HVECU 7 determines that "the change in accelerator operation amount for deceleration Δacc>the predetermined amount A" is not satisfied (No in step S211), the HVECU 7 performs the reference power generation control (step S221). The HVECU 7 then returns the control routine. When the HVECU 7 determines that "the change in accelerator operation amount for deceleration Δacc>the predetermined amount A" is satisfied (Yes in step S211), the HVECU 7 determines whether a schedule for reducing the catalyst temperature is selectable (step S212). When the HVECU 7 determines that the schedule for reducing the catalyst temperature is selectable (Yes in step S212), the HVECU 7 switches to the temperature reduction control line (step S213).

Subsequently, the HVECU 7 determines whether there is a reacceleration input or a vehicle speed maintaining input (step S214). When the HVECU 7 determines that there is neither a reacceleration input nor a vehicle speed maintaining input (No in step S214), the HVECU 7 determines whether there is a brake input (step S215). When the HVECU 7 determines that there is no brake input (No in step S215), the HVECU 7 proceeds to step S218. When the HVECU 7 determines that there is a brake input (Yes in step S215), the HVECU 7 calculates a required temperature reduction level (step S216). The HVECU 7 then changes a temperature reduction operation line (step S217). Thereafter, the HVECU 7 proceeds to step S218.

Next, the HVECU 7 determines whether the catalyst temperature is lower than the catalyst deactivation temperature (step S218). When the HVECU 7 determines that the catalyst temperature is not lower than the catalyst deactivation temperature (No in step S218), the HVECU 7 proceeds to step S219. When the HVECU 7 determines in step S212 that the schedule for reducing the catalyst temperature is not selectable (No in step S212), the HVECU 7 proceeds to step S219. The HVECU 7 then prohibits intermittent operation of the engine 2 (step S219) and thereafter performs low load operation of the engine 2 (step S220). The HVECU 7 then proceeds to step S214.

When the HVECU 7 determines in step S214 that there is a reacceleration input or a vehicle speed maintaining input (Yes in step S214), the HVECU 7 performs the reference power generation control (step S221). The HVECU 7 then returns the control routine. When the HVECU 7 determines in step S218 that the catalyst temperature is lower than the catalyst deactivation temperature (Yes in step S218), the HVECU 7 performs the reference power generation control (step S221). The HVECU 7 then returns the control routine.

In the third embodiment, in the case where there is a request for engine power generation and the temperature reduction control for reducing the catalyst temperature is also necessary, the temperature reduction control is started. The temperature reduction control is triggered by a reduction in accelerator operation amount. When the temperature reduction control starts and there is a brake input during deceleration of the vehicle, it is necessary to increase the temperature drop rate of the catalyst temperature. However, it is difficult to increase the temperature drop rate of the catalyst temperature by changing the engine operating point that maintains the engine power generation amount. Accordingly, the engine power generation amount is changed to the lower load side.

Figure 13:
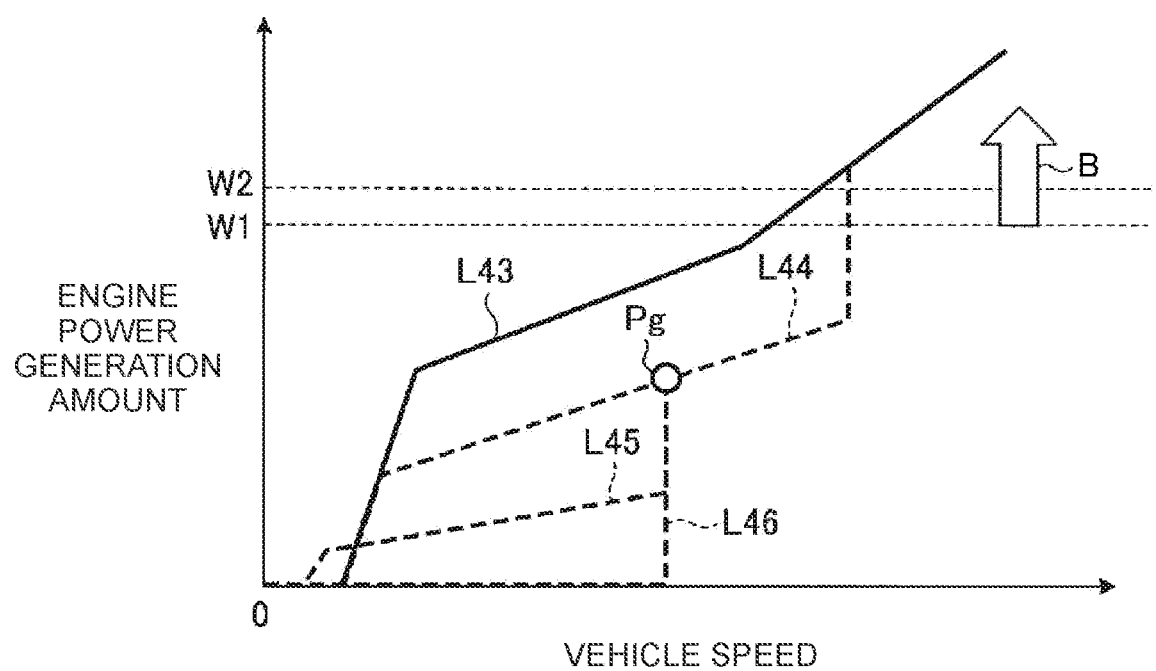
FIG. 13 illustrates an example of power generation operation lines in the third embodiment.

FIG. 13 illustrates an example of power generation operation lines in the third embodiment. FIG. 13 represents a two-dimensional map determined by the vehicle speed and the engine power generation amount. In FIG. 13, the engine power generation amount is used as the catalyst temperature information, the engine power generation amount W1 is information corresponding to the catalyst temperature being the catalyst deactivation temperature, and the engine power generation amount W2 is information corresponding to the catalyst temperature being the temperature for the temperature reduction control. Arrow B in FIG. 13 indicates that the catalyst temperature is in the catalyst deactivation temperature range when the engine power generation amount is equal to or larger than the engine power generation amount W1. A power generation operation line L43 shown by a thick continuous line in FIG. 13 is a power generation operation line defined on the two-dimensional map. On the power generation operation line L43, the engine power generation amount increases with an increase in vehicle speed. Power generation operation lines L44, L45, and L46 shown by thick dashed lines in FIG. 13 are power generation operation lines exclusively for the temperature reduction control for reducing the catalyst temperature.

In FIG. 13, in the case where the current engine operating point moves along the power generation operation line L44 exclusively for the temperature reduction control for reducing the catalyst temperature and there is a brake input at the operating point Pg, it takes less time until the vehicle is stopped than in the case where there is no brake input. It is therefore necessary to increase the temperature drop rate of the catalyst temperature. Accordingly, as shown in FIG. 13, in the case where there is a brake input at the operating point Pg on the power generation operation line L44, the HVECU 7 calculates a required temperature reduction level according to the magnitude of the brake input. For example, when the required temperature reduction level is low, the HVECU 7 changes the power generation operation line (temperature reduction operation line) to the power generation operation line L45 that can reduce the engine power generation amount and increase the temperature drop rate more than the power generation operation line L44. When the required temperature reduction level is high, the HVECU 7 changes the power generation operation line (temperature reduction operation line) to the power generation operation line L46 where the low load operation of the engine 2 such as idling can be performed to maximize the temperature drop rate. Accordingly, even when there is a brake input during deceleration of the vehicle during the temperature reduction control, the catalyst temperature can be reduced to a temperature lower than the catalyst deactivation temperature by the time the engine 2 is stopped.

Fourth Embodiment

A fourth embodiment of the power generation control device according to the disclosure will be described. In the fourth embodiment, the same description as that of the first embodiment will be omitted as appropriate.

Figure 14:
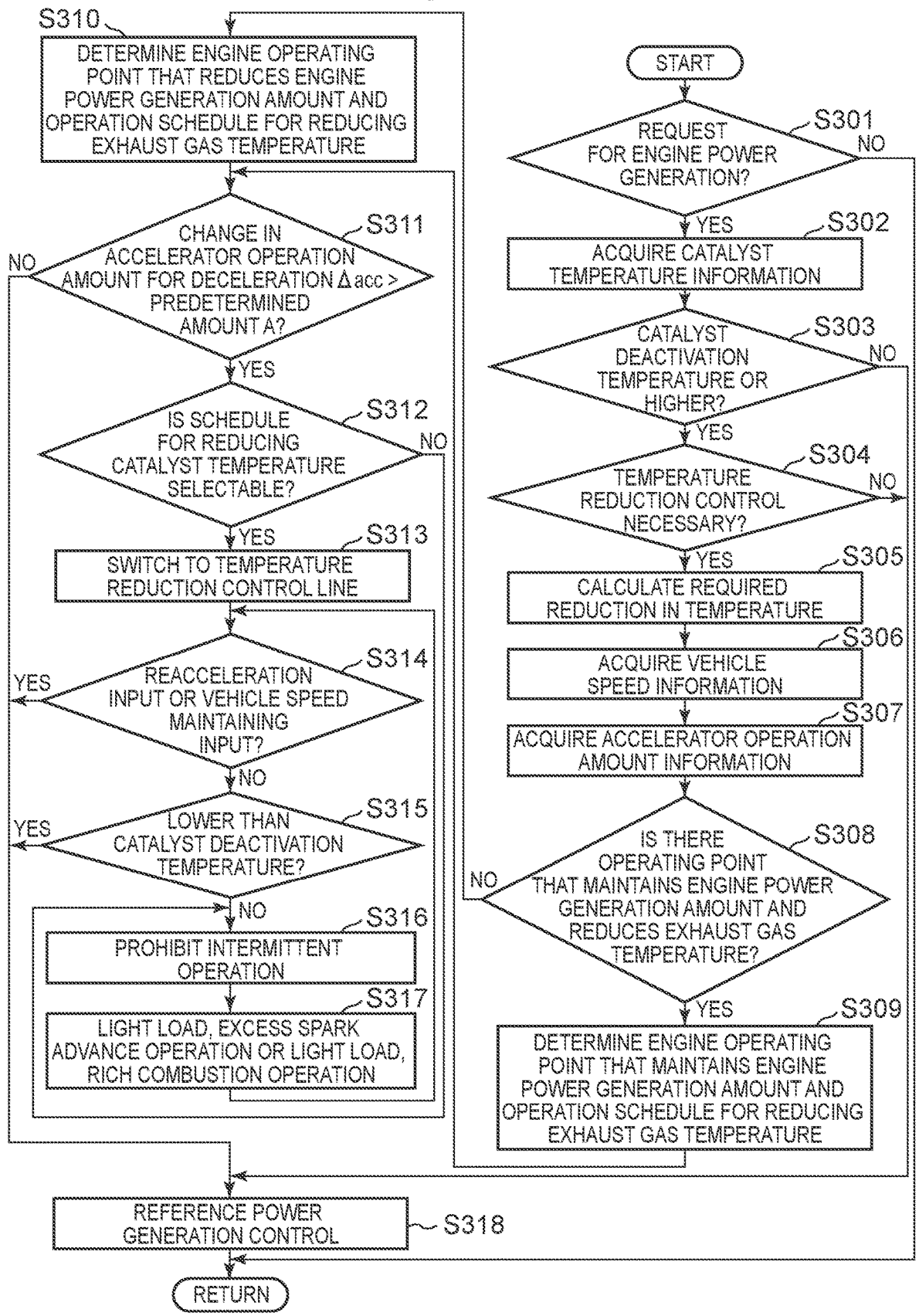
FIG. 14 is a flowchart illustrating an example of power generation control in a fourth embodiment.

FIG. 14 is a flowchart illustrating an example of power generation control in the fourth embodiment. The flowchart of the power generation control shown in FIG. 14 is different from the flowchart of the power generation control of the first embodiment shown in FIG. 2 in that when it is determined at a predetermined timing during the temperature reduction control that the temperature reduction control will not be completed by the time the engine 2 is stopped, low load, excess spark advance operation or low load, rich combustion (rich air-fuel ratio (A/F) operation) is performed as means for increasing the temperature drop rate.

Referring to FIG. 14, the HVECU 7 first determines whether there is a request for engine power generation (step S301). When the HVECU 7 determines that there is no request for engine power generation (No in step S301), the HVECU 7 returns the control routine. When the HVECU 7 determines that there is a request for engine power generation (Yes in step S301), the HVECU 7 acquires catalyst temperature information (step S302). The HVECU 7 subsequently acquires the catalyst temperature information as necessary.

Next, the HVECU 7 determines whether the catalyst temperature is equal to or higher than the catalyst deactivation temperature (step S303). When the HVECU 7 determines that the catalyst temperature is not equal to or higher the catalyst deactivation temperature (No in step S303), the HVECU 7 performs the reference power generation control (step S318). The HVECU 7 then returns the control routine. When the HVECU 7 determines that the catalyst temperature is equal to or higher than the catalyst deactivation temperature (Yes in step S303), the HVECU 7 determines whether the temperature reduction control is necessary (step S304). When the HVECU 7 determines that the temperature reduction control is not necessary (No in step S304), the HVECU 7 performs the reference power generation control (step S318). The HVECU 7 then returns the control routine. When the HVECU 7 determines that the temperature reduction control is necessary (Yes in step S304), the HVECU 7 calculates a required reduction in catalyst temperature (step S305). The HVECU 7 then acquires vehicle speed information (step S306). Thereafter, the HVECU 7 acquires accelerator operation amount information (step S307).

Subsequently, the HVECU 7 determines whether there is an engine operating point that maintains the engine power generation amount and reduces the exhaust gas temperature (step S308). When the HVECU 7 determines that there is an engine operating point that maintains the engine power generation amount and reduces the exhaust gas temperature (Yes in step S308), the HVECU 7 determines the engine operating point that maintains the engine power generation amount and an operation schedule for reducing the exhaust gas temperature (step S309). The HVECU 7 then proceeds to step S311. When the HVECU 7 determines that there is no engine operating point that maintains the engine power generation amount and reduces the exhaust gas temperature (No in step S308), the HVECU 7 determines an engine operating point that reduces the engine power generation amount and an operation schedule for reducing the exhaust gas temperature (step S310). The HVECU 7 then proceeds to step S311.

Thereafter, the HVECU 7 determines whether "the change in accelerator operation amount for deceleration Δacc>the predetermined amount A" is satisfied (step S311). When the HVECU 7 determines that "the change in accelerator operation amount for deceleration Δacc>the predetermined amount A" is not satisfied (No in step S311), the HVECU 7 performs the reference power generation control (step S318). The HVECU 7 then returns the control routine. When the HVECU 7 determines that "the change in accelerator operation amount for deceleration Δacc>the predetermined amount A" is satisfied (Yes in step S311), the HVECU 7 determines whether a schedule for reducing the catalyst temperature is selectable (step S312). When the HVECU 7 determines that the schedule for reducing the catalyst temperature is selectable (Yes in step S312), the HVECU 7 switches to the temperature reduction control line (step S313).

Subsequently, the HVECU 7 determines whether there is a reacceleration input or a vehicle speed maintaining input (step S314). When the HVECU 7 determines that there is neither a reacceleration input nor a vehicle speed maintaining input (No in step S314), the HVECU 7 determines whether the catalyst temperature is lower than the catalyst deactivation temperature (step S315). When the HVECU 7 determines that the catalyst temperature is not lower than the catalyst deactivation temperature (No in step S315), the HVECU 7 proceeds to step S316. When the HVECU 7 determines in step S312 that the schedule for reducing the catalyst temperature is not selectable (No in step S312), the HVECU 7 proceeds to step S316. The HVECU 7 then prohibits intermittent operation of the engine 2 (step S316). Thereafter, the HVECU 7 performs low load, excess spark advance operation of the engine 2 or low load, rich (more fuel) A/F operation of the engine 2 is performed (step S317). The HVECU 7 then proceeds to step S314.

When the HVECU 7 determines in step S314 that there is a reacceleration input or a vehicle speed maintaining input (Yes in step S314), the HVECU 7 performs the reference power generation control (step S318). The HVECU 7 then returns the control routine. When the HVECU 7 determines in step S315 that the catalyst temperature is lower than the catalyst deactivation temperature (Yes in step S315), the HVECU 7 performs the reference power generation control (step S318). The HVECU 7 then returns the control routine.

In the fourth embodiment, when it is determined that the temperature reduction control for reducing the catalyst temperature will not be completed by the time the engine 2 is stopped, low load, excess spark advance operation of the engine 2 or low load, rich combustion operation (rich A/F operation) of the engine 2 is performed because it is necessary to maximize the temperature drop rate. In the rich combustion operation, the engine 2 is operated with a richer in-cylinder air-fuel ratio in the engine 2 than the stoichiometric air-fuel ratio.

Figure 15:
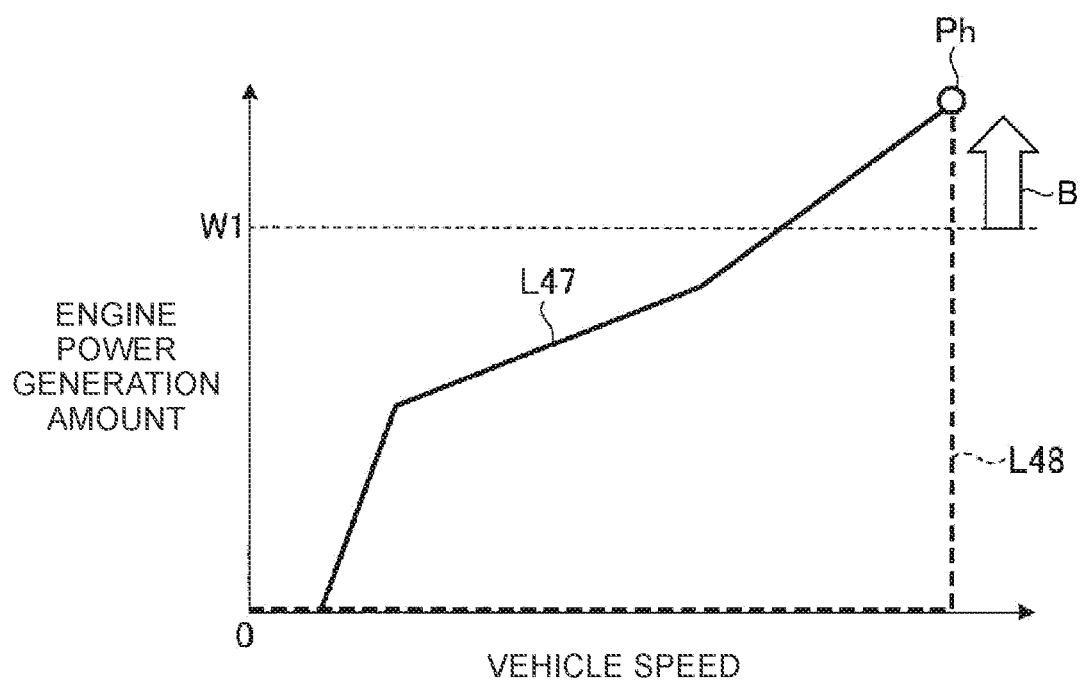
FIG. 15 illustrates an example of power generation operation lines in the fourth embodiment.

FIG. 15 illustrates an example of power generation operation lines in the fourth embodiment. FIG. 15 represents a two-dimensional map determined by the vehicle speed and the engine power generation amount. FIG. 15 illustrates an example in which the catalyst temperature is equal to or higher than the catalyst deactivation temperature at a predetermined timing during the temperature reduction control (e.g., in step S315 in the flowchart of FIG. 14). In FIG. 15, the engine power generation amount is used as the catalyst temperature information, and the engine power generation amount W1 is information corresponding to the catalyst temperature being the catalyst deactivation temperature. Arrow B in FIG. 15 indicates that the catalyst temperature is in the catalyst deactivation temperature range when the engine power generation amount is equal to or larger than the engine power generation amount W1.

A power generation operation line L47 shown by a thick continuous line in FIG. 15 is a power generation operation line defined on the two-dimensional map. On the power generation operation line L47, the engine power generation amount increases with an increase in vehicle speed. A power generation operation line L48 shown by a thick dashed line in FIG. 15 is a power generation operation line exclusively for the temperature reduction control for reducing the catalyst temperature. An operating point Ph on the power generation operation line L47 is an engine operating point where the engine operation amount is equal to or larger than the engine power generation amount W1 corresponding to the catalyst deactivation temperature.

In FIG. 15, in the case where the current engine operating point is the operating point Ph on the power generation operation line L47, the HVECU 7 moves the engine operating point along the power generation operation line L48 when the HVECU 7 determines that there is not enough time to reduce the catalyst temperature to a temperature lower than the catalyst deactivation temperature by the time the engine 2 is stopped. The HVECU 7 thus performs low load, excess spark advance operation of the engine 2 or low load, rich combustion operation of the engine 2 to reduce the exhaust gas temperature as much as possible and thus maximize the temperature drop rate of the catalyst temperature. The catalyst temperature can thus be reduced to a temperature lower than the catalyst deactivation temperature by the time the engine 2 is stopped.

What is claimed is:

1. A control device for a series hybrid vehicle, the series hybrid vehicle including:
   an engine,
   a catalyst that is disposed in an exhaust path of the engine and controls exhaust gas,
   a generator that generates electric power using power output from the engine,
   a battery that stores the electric power generated by the generator, and
   a traction electric motor that is driven by the electric power stored in the battery, the control device comprising an electronic control unit configured to:
      perform intermittent operation of the engine in a case where a predetermined condition is satisfied;
      acquire information on a temperature of the catalyst;

change, when the information on the temperature of the catalyst indicates that the temperature of the catalyst is equal to or higher than a predetermined temperature, an operating point of the engine to an operating point that reduces a temperature of the exhaust gas while generating the electric power by the generator and that is on a power generation operation line that reduces an amount of power generation of the generator at the same vehicle speed, the power generation operation line being included in a plurality of power generation operation lines defined on a two-dimensional map that is determined by a vehicle speed and the amount of power generation of the generator;

determine at a predetermined timing whether the temperature of the catalyst will fall below a catalyst deactivation temperature, based on the information on the temperature of the catalyst; and prohibit the intermittent operation of the engine, and perform low load, excess spark advance operation of the engine or low load, rich A/F operation of the engine, in a case where the temperature of the catalyst does not fall below the catalyst deactivation temperature.

2. The control device for the series hybrid vehicle according to claim 1, wherein the information on the temperature of the catalyst is the amount of power generation of the generator.

3. The control device for the series hybrid vehicle according to claim 1, wherein the electronic control unit is configured to return the operating point to an original power generation operation line when the information on the temperature of the catalyst indicates that the temperature of the catalyst has become lower than the catalyst deactivation temperature.

4. The control device for the series hybrid vehicle according to claim 2, wherein the electronic control unit is configured to set the plurality of power generation operation lines as a power generation operation area and select the power generation operation area.

5. The control device for the series hybrid vehicle according to claim 2, wherein the electronic control unit is configured to change the operating point when a decrease in accelerator opening amount is larger than a predetermined value.

6. A control method for a series hybrid vehicle, the series hybrid vehicle including
an engine,
a catalyst that is disposed in an exhaust path of the engine and controls exhaust gas,
a generator that generates electric power using power output from the engine,
a battery that stores the electric power generated by the generator, and
a traction electric motor that is driven by the electric power stored in the battery, the control method comprising:

performing intermittent operation of the engine in a case where a predetermined condition is satisfied;

acquiring, by an electronic control unit, information on a temperature of the catalyst;

changing, when the information on the temperature of the catalyst indicates that the temperature of the catalyst is equal to or higher than a predetermined temperature, by the electronic control unit, an operating point of the engine to an operating point that reduces a temperature of the exhaust gas while generating the electric power by the generator and that is on a power generation operation line that reduces an amount of power generation of the generator at the same vehicle speed, the power generation operation line being included in a plurality of power generation operation lines defined on a two-dimensional map that is determined by a vehicle speed and the amount of power generation of the generator;

determining at a predetermined timing whether the temperature of the catalyst will fall below a catalyst deactivation temperature, based on the information on the temperature of the catalyst; and prohibiting the intermittent operation of the engine, and performing low load, excess spark advance operation of the engine or low load, rich A/F operation of the engine, in a case where the temperature of the catalyst does not fall below the catalyst deactivation temperature.

7. The control device for the series hybrid vehicle according to claim 1, wherein the predetermined timing is a timing after changing the operating point of the engine.

8. The control device for the series hybrid vehicle according to claim 5, wherein the electronic control unit is configured to perform reference power generation control when there is a reacceleration input or a vehicle speed maintaining input.

* * * * *